United States Patent
Sun et al.

(10) Patent No.: US 11,671,983 B2
(45) Date of Patent: Jun. 6, 2023

(54) CONFIGURED GRANT UPLINK COMMUNICATION USING DYNAMIC RESOURCE POOLS

(71) Applicant: QUALCOMM Incorporated, San Diego, CA (US)

(72) Inventors: Jing Sun, San Diego, CA (US); Yisheng Xue, San Diego, CA (US); Xiaoxia Zhang, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 58 days.

(21) Appl. No.: 17/302,165

(22) Filed: Apr. 26, 2021

(65) Prior Publication Data

US 2021/0400712 A1    Dec. 23, 2021

Related U.S. Application Data

(60) Provisional application No. 63/041,698, filed on Jun. 19, 2020.

(51) Int. Cl.
| | |
|---|---|
| *H04W 28/08* | (2023.01) |
| *H04W 72/23* | (2023.01) |
| *H04W 72/1268* | (2023.01) |
| *H04W 72/02* | (2009.01) |
| *H04W 72/566* | (2023.01) |

(52) U.S. Cl.
CPC ............ *H04W 72/23* (2023.01); *H04W 72/02* (2013.01); *H04W 72/1268* (2013.01); *H04W 72/569* (2023.01)

(58) Field of Classification Search
None
See application file for complete search history.

(56) References Cited

U.S. PATENT DOCUMENTS

| | | | | |
|---|---|---|---|---|
| 11,026,251 B2* | 6/2021 | Yoshimoto | ............ | H04W 72/21 |
| 11,153,886 B2* | 10/2021 | Zhang | ................. | H04W 72/542 |
| 11,477,740 B2* | 10/2022 | Yi | ......................... | H04W 76/27 |
| 11,546,924 B2* | 1/2023 | Sun | ........................ | H04L 1/1864 |
| 2014/0254544 A1* | 9/2014 | Kar Kin Au | .......... | H04L 1/1812 |
| | | | | 370/329 |
| 2017/0171859 A1* | 6/2017 | Nimbalker | .......... | H04W 72/042 |
| 2018/0027575 A1* | 1/2018 | Shi | ....................... | H04W 72/048 |
| | | | | 370/336 |
| 2019/0069319 A1* | 2/2019 | Arshad | .................. | H04L 5/0053 |
| 2019/0158249 A1* | 5/2019 | Harada | .................. | H04W 72/23 |
| 2019/0159073 A1* | 5/2019 | Tang | ...................... | H04W 72/02 |
| 2019/0335480 A1* | 10/2019 | Sun | ........................ | H04W 72/14 |
| 2021/0243758 A1* | 8/2021 | Ji | ............................ | H04L 5/0044 |
| 2021/0250931 A1* | 8/2021 | Yang | ........................ | H04L 5/003 |
| 2022/0039144 A1* | 2/2022 | Alabbasi | ................ | H04W 72/23 |

* cited by examiner

*Primary Examiner* — Sithu Ko
(74) *Attorney, Agent, or Firm* — Qualcomm Incorporated

(57) ABSTRACT

Various aspects of the present disclosure generally relate to wireless communication. In some aspects, a user equipment may receive a configuration of one or more resource pools for configured grant uplink communications; receive an indication that modifies a number of resources, in the one or more resource pools, that are available for configured grant uplink communications; and transmit a configured grant uplink communication in the one or more resource pools based at least in part on the indication. Numerous other aspects are provided.

30 Claims, 12 Drawing Sheets

CONFIGURED GRANT UPLINK COMMUNICATION USING DYNAMIC RESOURCE POOLS

CROSS-REFERENCE TO RELATED APPLICATION

This Patent Application claims priority to U.S. Provisional Patent Application No. 63/041,698, filed on Jun. 19, 2020, entitled "CONFIGURED GRANT UPLINK COMMUNICATION USING DYNAMIC RESOURCE POOLS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for configured grant uplink communication using dynamic resource pools.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a configuration of one or more resource pools for configured grant uplink communications; receiving an indication that modifies a number of resources, in the one or more resource pools, that are available for configured grant uplink communications; and transmitting a configured grant uplink communication in the one or more resource pools based at least in part on the indication.

In some aspects, a method of wireless communication, performed by a base station, may include transmitting, to a UE, a configuration of one or more resource pools for configured grant uplink communications; transmitting, to the UE, an indication that modifies a number of resources, in the one or more resource pools, that are available for configured grant uplink communications; and receiving, from the UE, a configured grant uplink communication in the one or more resource pools based at least in part on the indication.

In some aspects, a non-transitory computer-readable medium may store one or more instructions for wireless communication. The one or more instructions, when executed by one or more processors of a UE, may cause the one or more processors to receive a configuration of one or more resource pools for configured grant uplink communications; receive an indication that modifies a number of resources, in the one or more resource pools, that are available for configured grant uplink communications; and transmit a configured grant uplink communication in the one or more resource pools based at least in part on the indication.

In some aspects, a non-transitory computer-readable medium may store one or more instructions for wireless communication. The one or more instructions, when executed by one or more processors of a base station, may cause the one or more processors to transmit, to a UE, a configuration of one or more resource pools for configured grant uplink communications; transmit, to the UE, an indication that modifies a number of resources, in the one or more resource pools, that are available for configured grant uplink communications; and receive, from the UE, a configured grant uplink communication in the one or more resource pools based at least in part on the indication.

In some aspects, a user equipment for wireless communication may include a memory and one or more processors coupled to the memory. The memory and the one or more processors may be configured to receive a configuration of one or more resource pools for configured grant uplink communications; receive an indication that modifies a number of resources, in the one or more resource pools, that are available for configured grant uplink communications; and transmit a configured grant uplink communication in the one or more resource pools based at least in part on the indication.

In some aspects, a base station for wireless communication may include a memory and one or more processors coupled to the memory. The memory and the one or more processors may be configured to transmit, to a UE, a configuration of one or more resource pools for configured grant uplink communications; transmit, to the UE, an indication that modifies a number of resources, in the one or more resource pools, that are available for configured grant uplink communications; and receive, from the UE, a configured grant uplink communication in the one or more resource pools based at least in part on the indication.

In some aspects, an apparatus for wireless communication may include means for receiving a configuration of one or more resource pools for configured grant uplink communications; means for receiving an indication that modifies a number of resources, in the one or more resource pools, that are available for configured grant uplink communications; and means for transmitting a configured grant uplink communication in the one or more resource pools based at least in part on the indication.

In some aspects, an apparatus for wireless communication may include means for transmitting, to a UE, a configuration of one or more resource pools for configured grant uplink communications; means for transmitting, to the UE, an indication that modifies a number of resources, in the one or more resource pools, that are available for configured grant uplink communications; and means for receiving, from the UE, a configured grant uplink communication in the one or more resource pools based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
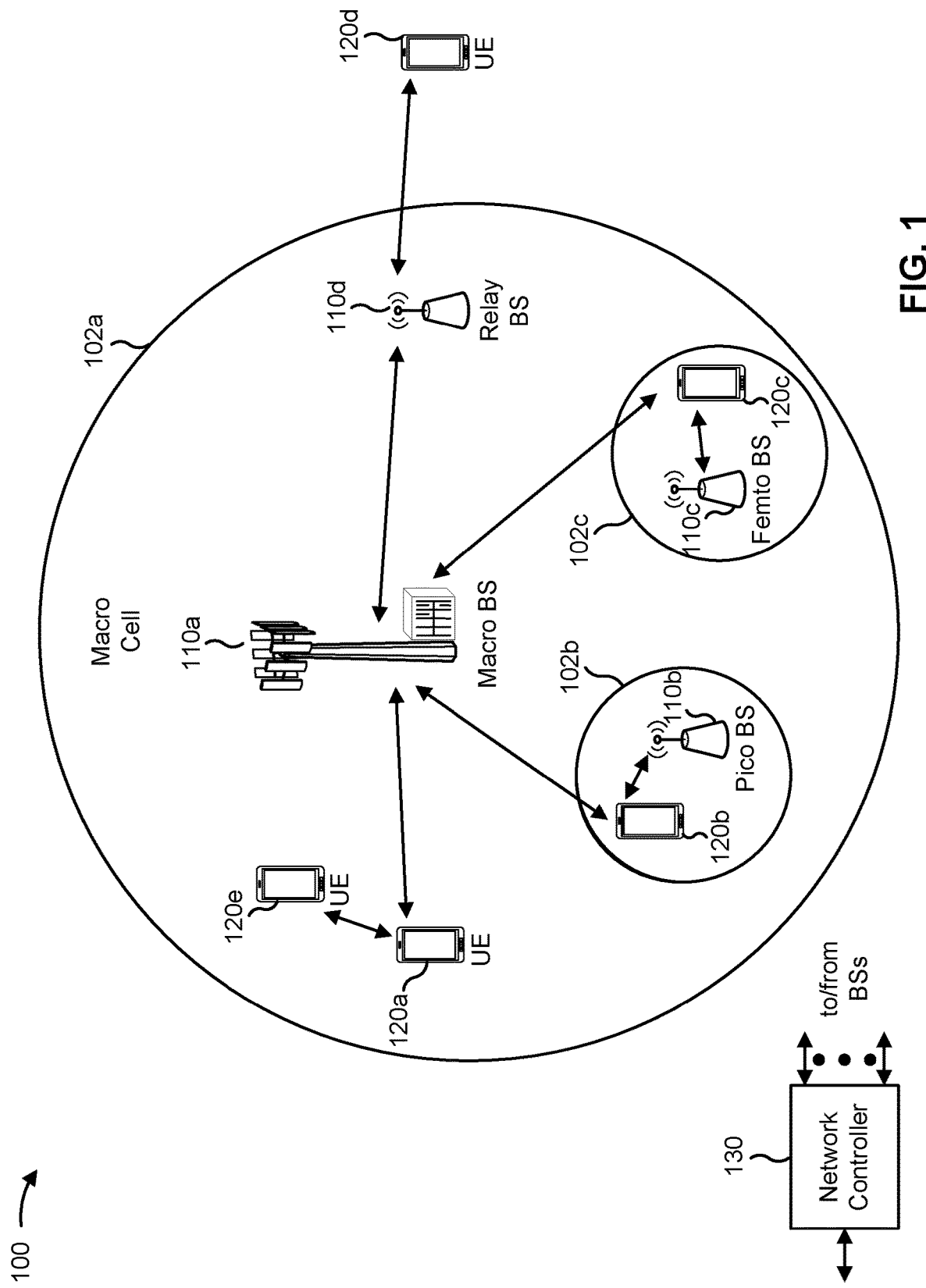
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (VI) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
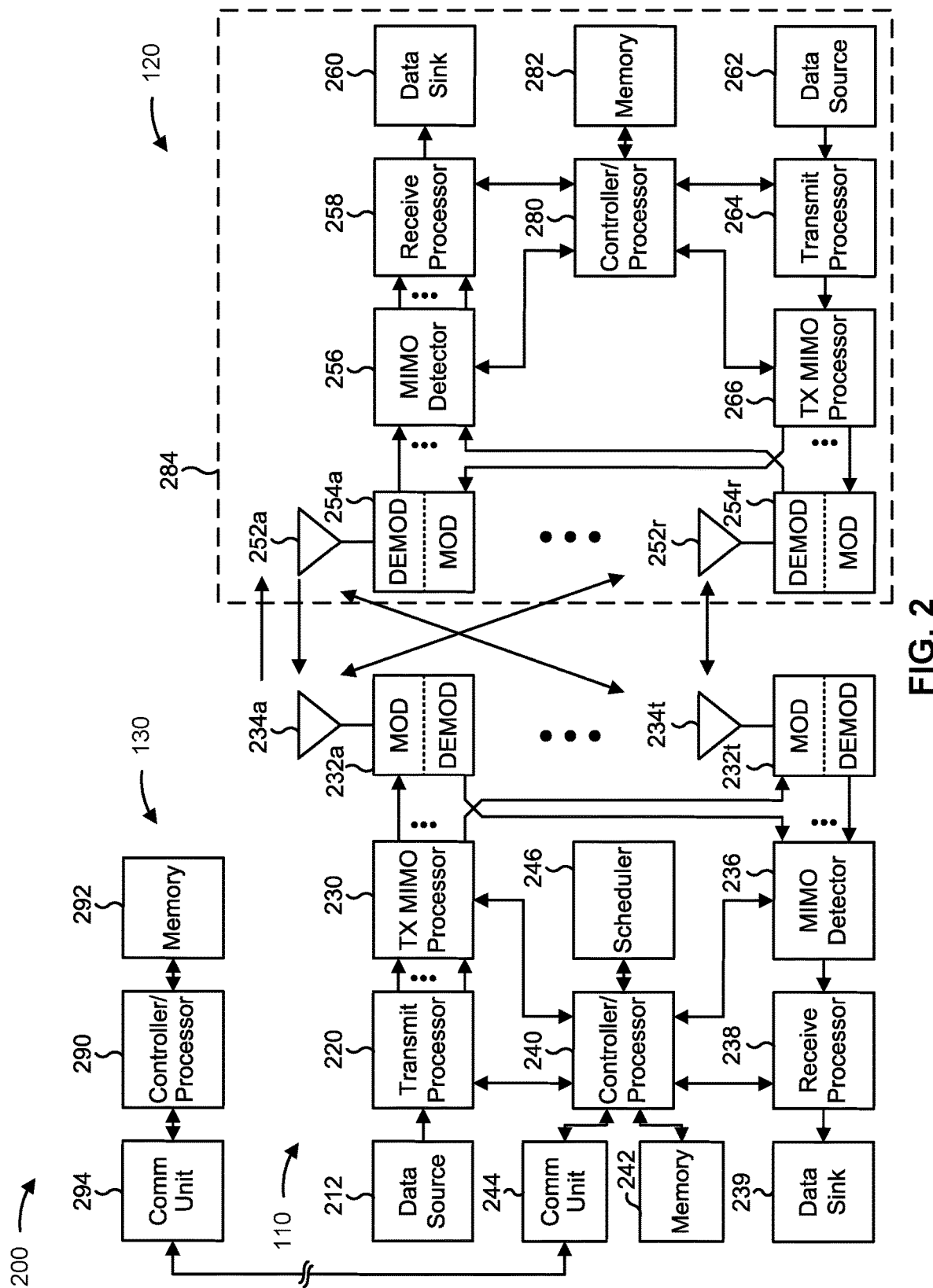
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-12).

Controller/processor 240 of base station 110, controller/processor 280 of UE 120, and/or any other component(s) of FIG. 2 may perform one or more techniques associated with configured grant uplink communication using dynamic resource pools, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, UE 120 may include means for receiving a configuration of one or more resource pools for configured grant uplink communications, means for receiving an indication that modifies a number of resources, in the one or more resource pools, that are available for configured grant uplink communications, means for means for transmitting a configured grant uplink communication in the one or more resource pools based at least in part on the indication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a configuration of one or more resource pools for configured grant uplink communications, means for transmitting, to the UE, an indication that modifies a number of resources, in the one or more resource pools, that are available for configured grant uplink communications, means for receiving, from the UE, a configured grant uplink communication in the one or more resource pools based at least in part on the indication, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some UEs may be associated with a reduced capability relative to a baseline UE (e.g., an enhanced mobile broadband (eMBB) UE and/or the like). For example, a reduced capability (RedCap) UE, an Internet of Things (IoT) UE, a machine-type communication (MTC) UE, an NR Light UE, and/or the like may be associated with a reduced capability relative to an eMBB UE. A RedCap UE may be used for an industrial wireless sensor, a video surveillance device, a smart wearable device, and/or the like. A RedCap UE may have a lower communicative capacity, relative to a baseline UE (e.g., an eMBB UE and/or the like). For example, a RedCap UE may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and/or the like. A RedCap UE may also have a prolonged battery life, relative to a baseline UE (e.g., an eMBB UE and/or the like). RedCap UEs may co-exist with UEs implementing protocols such as eMBB, ultra-reliable low latency communication (URLLC), LTE NB-IoT/MTC, and/or the like. In some aspects, RedCap UEs, such as industrial wireless sensors, may be associated with intensive uplink traffic, moderate reliability and latency (e.g., non-URLLC), small packet size with a relatively long TX interval (e.g., low data rate), and high capacity (e.g., up to 1 UE per square meter).

In some cases, a UE may use a dynamic grant for uplink communication, wherein the UE receives information specifying a resource for a transmission to be performed by the UE. However, in some cases, such as with a large quantity of reduced-capability UEs, dynamic grant based communications may challenge a capacity of a physical downlink control channel (PDCCH). In some cases, a UE may use a configured grant for uplink communication, wherein the configured grant may be configured using configuration information that specifies a recurring grant for an uplink transmission of the UE.

Figure 3:
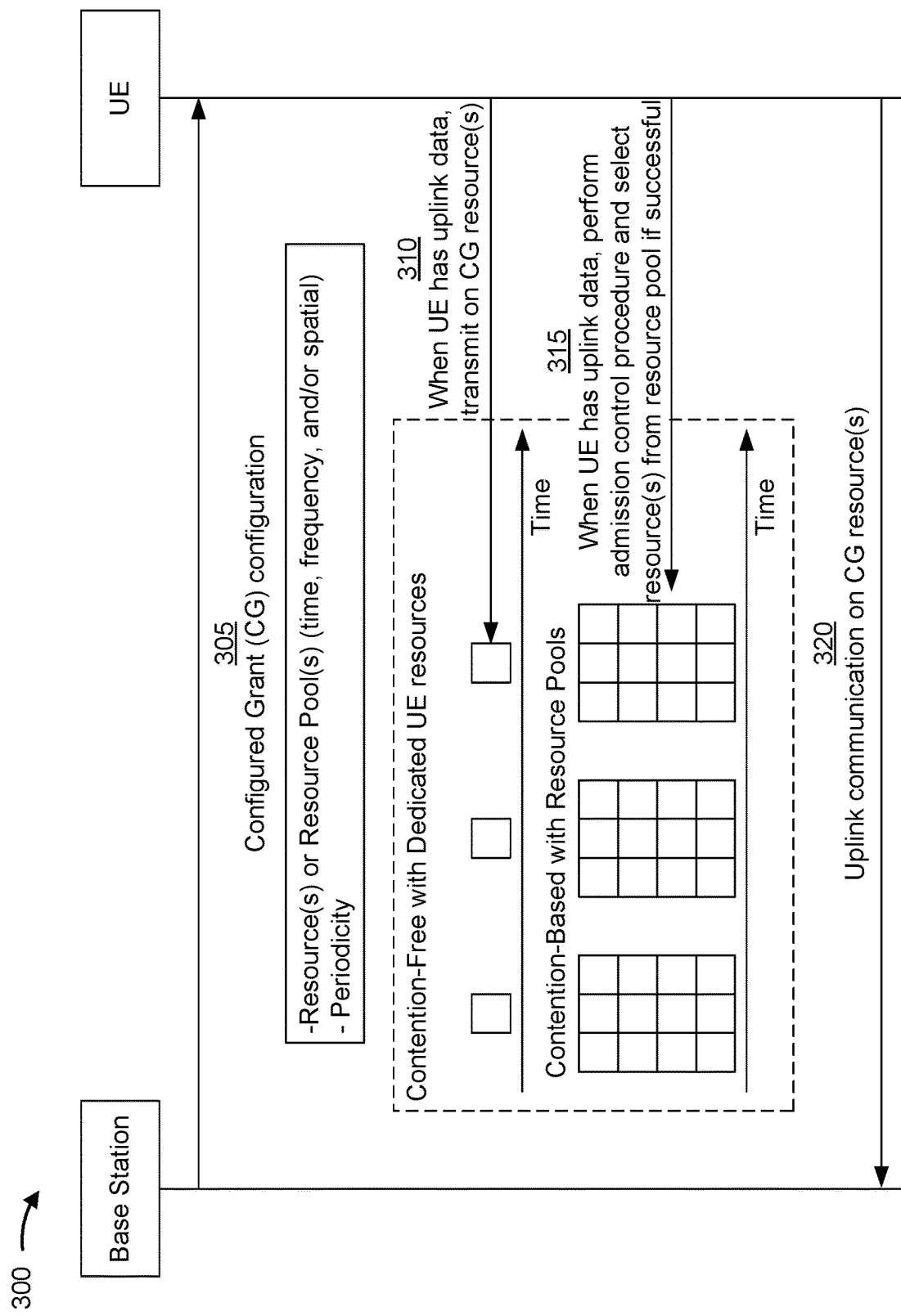
FIG. 3 is a diagram illustrating an example of configured grant (CG) communication, in accordance with the present disclosure.

FIG. 3 is a diagram illustrating an example 300 of configured grant (CG) communication, in accordance with the present disclosure. As shown, example 300 includes a base station and a UE.

As shown in FIG. 3, and by reference number 305, the base station may transmit a CG configuration to the UE. For example, the base station may transmit configuration information (e.g., radio resource configuration (RRC) information, downlink control information, and/or the like) that identifies the CG. In some aspects, the configuration information identifying the CG may indicate a resource allocation (e.g., time domain, frequency domain, spatial domain, code domain, and/or the like), a periodicity associated with the resource allocation, and/or the like. The CG may identify a resource or set of resources in which the UE is to perform an uplink communication (e.g., data, control information, and/or the like). For example, the CG may identify a resource allocation for a physical uplink shared channel (PUSCH) of the UE. In some aspects, the CG may identify a resource pool or multiple resource pools which may be available for the UE to perform an uplink transmission.

In some aspects, the CG configuration received by the UE may configure a contention-free CG with resources dedicated for the UE to transmit uplink communications. In this case, the CG configuration may indicate a resource allocation (e.g., time domain, frequency domain, spatial domain, code domain, and/or the like) dedicated for the UE to use to transmit uplink communications. The CG configuration may also configure the resource allocation for the UE to occur periodically, such that the resource allocation corresponds to periodically occurring transmission time occasions. As shown in FIG. 3, and by reference number 310, when the UE has uplink data to transmit, the UE transmits the uplink data on the CG resources identified by the CG configuration. For example, the UE transmits the uplink data in one of the CG uplink occasions identified in the CG configuration using the configured resource allocation.

A CG configuration with regular periodic CG uplink occasions with a dedicated resource allocation for the UE may be convenient for a UE with periodic uplink traffic (e.g., with trivial jitter). The CG configuration may configure the periodicity associated with the resource allocation to associate CG uplink occasions with periodic nominal arrival times at which traffic to be transmitted to the base station is expected to arrive at (or be ready to be transmitted by) the UE. However, the actual arrival times at which the traffic arrives (or is ready to be transmitted) by the UE may be different than the nominal arrival times, and this difference in times is known as jitter. In some aspects, traffic jittering may be handled by configuring multiple CGs around the nominal arrival times. In some aspects, multiple opportunities for the UE to transmit the uplink communication may be defined within a CG uplink occasion. The UE may be configured with multiple CG uplinks to allow the UE to repeatedly transmit the CG uplink communications and increase the likelihood that the base station receives the communications. NR CG uplink may depend on dynamic grant re-transmission. In some aspects, to suppress a quantity of dynamic grants, the CG can be configured with blind re-transmissions via multiple repetitions per occasion.

In some cases, CG configurations with dedicated resources allocated per UE may be inefficient. For example, CG configurations with dedicated UE resources for a large number of UEs may result in consumption of an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a packet may have been already decoded after the first one or more repetitions (early decoding) such that a remainder of the repetitions are unnecessary. Unlike a downlink case, this type of inefficient consumption of system resources cannot be addressed by scheduling, as the base station does not know exactly when traffic will arrive at the UEs.

In some aspects, statistical multiplexing schemes may be used to allocate CG uplink resource access among multiple UEs. Statistical multiplexing of CG uplink communications from multiple UEs may be useful in cases in which there are a high number of UEs associated with somewhat random traffic arrivals at the base station, cases in which a traffic arrival density for traffic arriving at the UEs is time varying, and/or the like. For example, statistical multiplexing of CG uplink communications from multiple UEs may be useful for a network deployment, such as an industrial wireless sensor network, with a large capacity of UEs. In such cases, the uplink traffic associated with at least a group of UEs may be delay insensitive.

As shown in FIG. 3, the CG configuration received by the UE may configure a contention-based CG with resource pools that are available for multiple UEs to use to transmit uplink communications. The contention-based CG configuration uses statistical multiplexing to share the resource pools among multiple UEs. A resource pool includes multiple resources (e.g., time domain, frequency domain, spatial domain, code domain, and/or the like) that can be allocated for uplink transmission by the UE. For example, an x-axis of a resource pool may indicate transmission times and the y-axis of the resource pool may indicate resources (e.g., frequency domain, spatial domain, code domain, and/or the like) that can be allocated at each transmission time. In some aspects, the same resource pools may be configured for multiple UEs.

Statistical multiplexing schemes may involve spreading control and overloading control. For example, spreading relates to distributing traffic (as interference to others) into a resource pool. In a specific example, direct spreading CDMA may be utilized in legacy 3G systems. NR systems which rely on an OFDMA network may utilize organized randomized resource selection, in which the base station can identify sources that contribute to collisions in a resource pool and/or local overloading of a resource pool.

Overloading control relates to controlling a level of multiplexing within a stable region. For example, overly aggressive multiplexing may result in an unusable resource pool. Rise over thermal (RoT) based control (in addition to power control) may be utilized in legacy 3G systems. In 3GPP, a central scheduler may be used to assign grants to respective UEs. In 3GPP2, a hybrid approach may be used in which an access network sends a reverse link activity bit to guide autonomous rate selection at respective UEs. Channel busy ratio (CBR) based control may be utilized in NR sidelink. For example, each sidelink UE may autonomously measure CBR and regulate its channel use based at least in part on the measured CBR.

As further shown in FIG. 3, and by reference number 315, for the contention-based CG configuration, when the UE has uplink data to be transmitted, the UE performs an admission control procedure and selects a resource/resources from the resource pool if the admission control procedure is successful. In some aspects, the admission control procedure may include the UE selecting a random number (e.g., between 0 and 1), comparing the random number with a threshold, and determining whether the random number satisfied the threshold. If the random number satisfies the threshold, the admission is successful and the UE may select a resource from the resource pool to transmit the uplink communication.

In some aspects, the base station may control the probability of the UE accessing the resource pool by setting and/or adjusting the threshold. For example, the base station may dynamically adjust the threshold to let more or fewer UEs access the resource pool in order to prevent resource collisions. Additionally, and/or alternatively, the base station may assign different thresholds to be used by different UEs.

In response to the UE determining that the random number satisfies the threshold, the UE may select a resource from the resource pool to transmit the uplink communication. The UE may select the resource from the resource pool using randomized and/or pseudo-randomized resource selection. For example, the UE may use a hashing function based at least in part on a UE identifier, time, and/or resource pool index to select the resource from the resource pool.

As further shown in FIG. 3, and by reference number 320, the UE transmits the uplink communication to the base station on the CG resource. For example, the UE may transmit the uplink communication as a PUSCH communication using a resource allocation identified by the CG.

As described above, multiple UEs may be configured to share the same resource pool, and the access probability may be controlled by the base station. In a case in which too many UEs try to access the resource pool, this admission control mechanism allows the base station to adjust the admission threshold such that each UE will have a lower probability to access the resources in the resource pool. However, in such a case, the uplink traffic load may remain high, and UEs that do not succeed in accessing the resource pool may need to send scheduling requests and use dynamic grants to transmit the uplink communications. Sending scheduling requests and receiving dynamic grants for uplink communications may introduce additional delay, additional uplink/downlink control overhead, and/or the like. This may cause a decrease in network speed and consume computing resources (e.g., processing resources, memory resources, communication resources, and/or the like), networking resources, and/or the like.

Some techniques and apparatuses described herein enable a base station to dynamically control a size of a resource pool and/or a number of resource pools for CG uplink communications to dynamically adjust a number of resources available to UEs for CG uplink communications. As a result, uplink communications from UEs to a base station may be performed more efficiently, and scheduling requests and dynamic grants for uplink communications may be reduced. This reduces delay, uplink/downlink control overhead, and/or the like, thus increasing network speed and conserving computing resources (e.g., processing resources, memory resources, communication resources, and/or the like), networking resources, and/or the like.

As indicated above, FIG. 3 is provided as an example. Other examples may differ from what is described with respect to FIG. 3.

Figure 4:
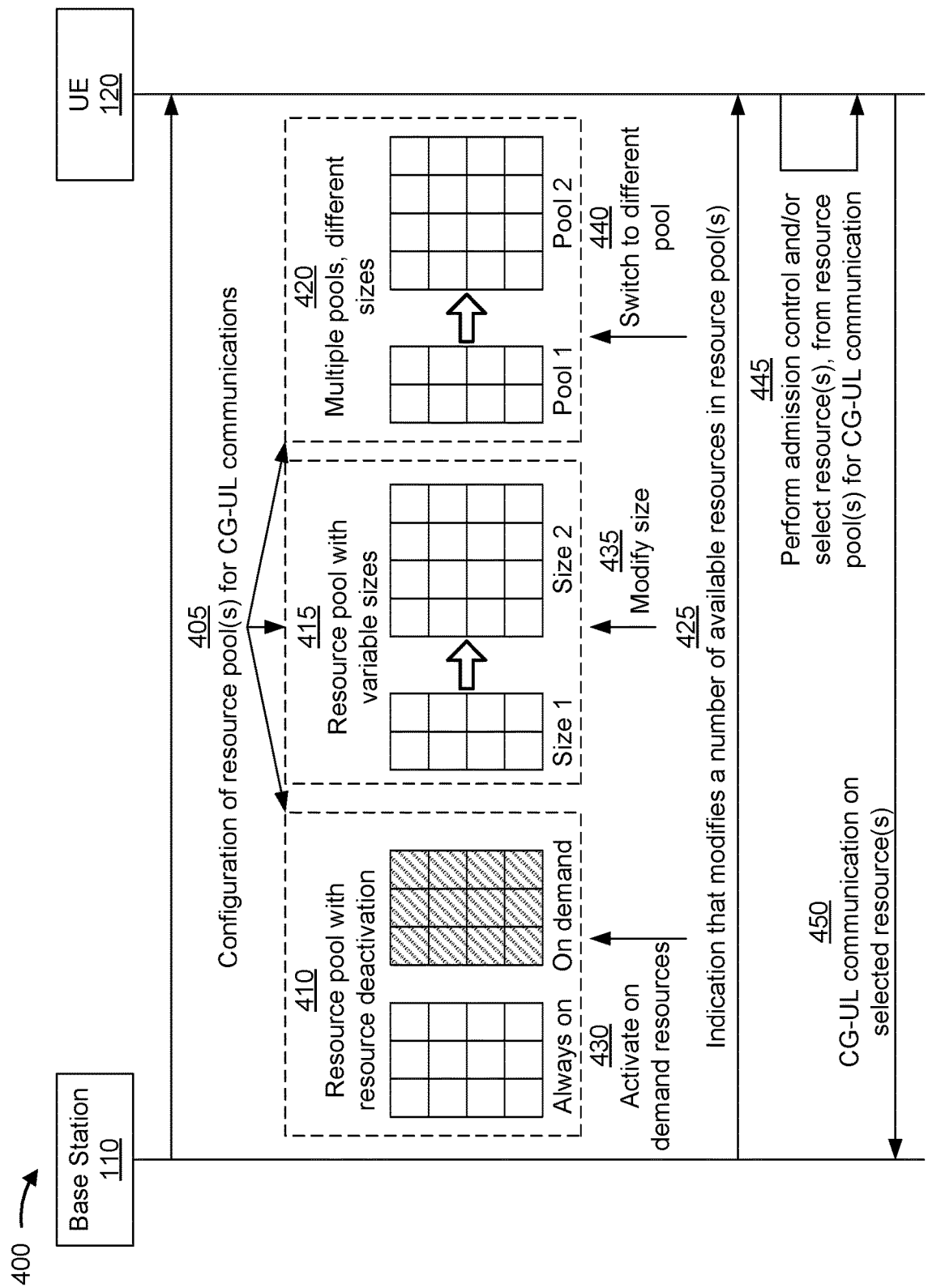
FIG. 4 is a diagram illustrating an example associated with configured grant uplink communication using dynamic resource pools, in accordance with the present disclosure.

FIG. 4 is a diagram illustrating an example 400 associated with configured grant uplink communication using dynamic resource pools, in accordance with the present disclosure. As shown in FIG. 4, a base station 110 and a UE 120 may communicate with one another.

As show by reference number 405, the base station 110 transmits, to the UE 120, a configuration of one or more resource pools for CG uplink communications. For example, the base station 110 may transmit, to the UE 120, configuration information (e.g., radio resource configuration (RRC) information, downlink control information, and/or the like) that identifies the one or more resource pools for CG uplink communications. The resource pool(s) includes multiple resources (e.g., time domain, frequency domain, spatial domain, code domain, and/or the like) that can be allocated for uplink transmission by the UE 120. In some aspects, the base station 110 may configure the same resource pool(s) for the UE 120 and one or more other UEs, such that the UE 120 and the one or more other UEs can be allocated resources from the configured resource pool(s) for CG uplink communications.

The resource pool(s) may identify one or more uplink transmission occasions. For example, the resource pool(s) may identify multiple uplink transmission occasions that occur periodically. An uplink transmission occasion may include multiple transmission resources (e.g., time domain, frequency domain, spatial domain, code domain, and/or the like) and multiple transmission times that may be allocated for the UE 120 to transmit a CG uplink communication. For example, the resource pool(s) may identify PUSCH transmission occasions that include multiple PUSCH transmission resources that can be allocated for multiple transmission times.

The configuration of one or more resource pools for CG uplink communications may also include a bit field indication that indicates to the UE 120 a bit field of a group common physical downlink control channel (GC-PDCCH) communication to be monitored by the UE 120 for an indication that modifies a number of resources in the one or more resource pools.

As shown in FIG. 4, in some aspects, the configuration transmitted by the base station 110 may configure a resource pool 410 with resource deactivation. The resource pool 410 may be configured with multiple uplink transmission occasions in the time domain, where some of the uplink transmission occasions are available or not available depending on dynamic downlink signaling from the base station 110. The resource pool 410 may be configured to include a first set of uplink transmission occasions in a first category and a second set of uplink transmission occasions in a second category. The first set of uplink transmission occasions may be activated by default and the second set of uplink transmission occasions may be deactivated by default. The first set of uplink transmission occasions may be always on uplink transmission occasions that cannot be dynamically deactivated. The second set of uplink transmission occasions may be on demand uplink transmission occasions that can be dynamically activated or deactivated by the base station 110.

As shown in FIG. 4, in some aspects, the configuration transmitted by the base station 110 may configure a resource pool 415 with multiple sizes. For example, the resource pool 415 may be configured with variable sizes in the time domain, frequency domain, spatial domain, and/or the like. The configuration may indicate multiple sizes of the resource pool 415 (e.g., size 1 and size 2 in FIG. 4), such that the size of the resource pool 415 can be adjusted between the multiple sizes depending on dynamic downlink signaling from the base station 110.

As shown in FIG. 4, in some aspects, the configuration transmitted by the base station 110 may configure a set of resource pools 420 that includes multiple resource pools with different sizes. For example, the set of resource pools 420 may be configured to have multiple resources pools with different sizes in the time domain, frequency domain, spatial domain, and/or the like. The configuration may configure the set of resource pools 420 by indicating multiple resource pools (e.g., pool 1 and pool 2 in FIG. 4) having different sizes, such that the different resource pools with the different sizes can be selected depending on dynamic downlink signaling from the base station 110.

As further shown in FIG. 4, and by reference number 425, the base station 110 transmits, to the UE 120, an indication that modifies a number of available resources in the one or more resource pools. In some aspects, the indication may be included in a GC-PDCCH communication transmitted by the base station 110. The GC-PDCCH communication may be transmitted from the base station 110 to a group of UEs including the UE 120 and one or more other UEs. As described above, the configuration of the one or more resource pools for CG uplink communications may include a bit field indication that indicates a bit field of the GC-PDCCH communication to be monitored by the UE 120. The indication may be a bit in the bit field of the GC-PDCCH communication indicated in the configuration.

In some aspects, the base station 110 may transmit the indication that modifies the number of available resources in the one or more resource pools based at least in part on a determination of whether uplink traffic satisfies a threshold. For example, the base station 110 may determine, based at least in part on a determination whether uplink traffic satisfies a threshold, that there is a heavier load than the current resource pool(s) can handle. In this case, the base station 110 may transmit the indication to increase the number of available resources in the resource pool(s). Additionally, and/or, alternatively, the base station 110 may determine, based at least in part on a determination whether uplink traffic satisfies a threshold, that the current resource pool(s) is underutilized. In this case, the base station 110 may transmit the indication to decrease the number of available resources in the resource pool(s), which may free up resources that can be used for other purposes, such as scheduled uplink and/or downlink communications.

As shown in FIG. 4, in some aspects in which the resource pool 410 with resource deactivation is configured, the indication that modifies the number of available resources may include an indication 430 to activate or deactivate on demand resources in the resource pool. For example, the indication 430 may indicate whether one or more on demand uplink transmission occasions (e.g., uplink transmission occasions in the second set of uplink transmission occasions) are to be activated or deactivated. The indication may be a bit (e.g., in the indicated bit field of the GC-PDCCH communication) that acts as an on/off indicator for one or more on demand uplink transmission occasions. For example, the bit field may be set to 1 to indicate activated on demand uplink transmission occasions and the bit field may be set to 0 to indicate deactivated on demand uplink transmission occasions.

As shown in FIG. 4, in some aspects in which the resource pool 415 with variable sizes is configured, the indication that modifies the number of available resources may include an indication 435 that modifies the size of the resource pool 415. The indication 435 may indicate an activated size of the multiple sizes for the resource pool 415. For example, the multiple sizes configured for the resource pool 415 may be associated with size indexes. The indication 435 may be a bit (e.g., in the indicated bit field of the GC-PDCCH communication) that indicates the size index for the activated size selected for the resource pool 415 from the multiple sizes.

As shown in FIG. 4, in some aspects in which the set of resource pools 420 including multiple resource pools with different sizes is configured, the indication that modifies the number of available resources may include an indication 440 to switch to a different resource pool of the multiple resource pools in the set of resource pools 420. The indication 440 may indicate a selected pool to be activated from the multiple resource pools in the set of resource pools 420. For example, the multiple resource pools configured for the set of resource pools 420 may be associated with pool indexes. The indication 440 may be a bit (e.g., in the indicated bit field of the GC-PDCCH communication) that indicates the pool index for the selected resource pool.

As further shown in FIG. 4, and by reference number 445, the UE 120 performs admission control and/or selects one or more resources from the one or more resource pools for CG uplink communication. In some aspects, the UE 120 may perform admission control for an uplink transmission occasion in the resource pool(s) based at least in part on a random number (denoted as 'q') determined by the UE 120 and an admission probability (denoted as 'p') set by the base station 110 to determine whether the UE 120 can access the resources in the uplink transmission occasion. By setting the admission probability p, the base station 110 can dynamically control the probability of the UE 120 to access the uplink transmission occasion in the resource pool.

The admission probability p is a threshold that the UE 120 compares with the random number q. If the random number q satisfies the admission probability threshold p, the admission is successful and the UE 120 can utilize the uplink transmission occasion to transmit a CG uplink communication. If the random number does not satisfy the admission probability threshold p, the admission has failed and the UE 120 cannot utilize the uplink transmission occasion to transmit a CG uplink communication. For example, the admission probability p may be set as $0 \leq p \leq 1$ and the random number q may be generated such that $\leq q \leq 1$. The UE 120 may compare the random number q with the admission probability p and determine that admission is successful if $q \geq p$.

In some aspects, q may be randomly generated by the UE 120 from a uniform distribution in a target range (e.g., between 0 and 1). In some aspects, different distributions may be used for determining q in order to weight q to be higher or lower based at least in part on one or more UE-specific parameters, such as a traffic quality of service (QoS) parameters, UE 120 priority, and/or the like. In some aspects, q may be a pseudo-random number generated as a function of one or more parameters including a parameter associated with the base station 110 (e.g., base station ID), a parameter associated with the UE 120 (e.g., UE ID), a time, a resource pool index, an MCS parameter, and/or the like.

In response to the UE 120 determining that the UE 120 can access an uplink transmission occasion in the resource pool(s), the UE 120 may select a resource in the uplink transmission occasion. In some aspects, the resource selection may be based at least in part on a UE-specific resource hashing function. The UE-specific resource hashing function may be based at least in part on various factors such as UE ID, time, resource pool index, and/or the like. Any hashing that results in a random or pseudo-random distribution across the uplink transmission occasion may be used. The hashing may be communicated to the base station 110, such that the base station 110 will know which resource in the resource pool(s) the UE 120 to transmit. In this case, the base station 110 can perform blind decoding of the CG PUSCH communication over the known resource(s) for the UE 120 rather than across the entirety of the resource pool.

As further shown in FIG. 4, and by reference number 450, the UE 120 transmits a CG uplink communication on the selected one or more resources. For example, the UE may transmit the CG uplink communication as a CG PUSCH communication using the selected resource(s). In some cases, the UE 120 may transmit CG uplink control information (CG-UCI) with a UE ID associated with the UE 120 in the CG PUSCH communication, so that the base station 110 can identify which UE 120 is transmitting from the results of decoding the CG PUSCH communication.

Configuring one or more dynamic resource pools for CG uplink communications and dynamically modifying a number of resources available in the one or more resource pools, as described in connection with FIG. 4, enables CG uplink communications from UEs (e.g., UE 120 and/or other UEs) to the base station 110 to be performed more efficiently and reduces scheduling requests and dynamic grants for uplink communications. As a result, delay, uplink/downlink control overhead, and/or the like, are reduced, thus increasing network speed and conserving computing resources (e.g., processing resources, memory resources, communication resources, and/or the like), networking resources, and/or the like.

As indicated above, FIG. 4 is provided as an example. Other examples may differ from what is described with respect to FIG. 4.

Figure 5:
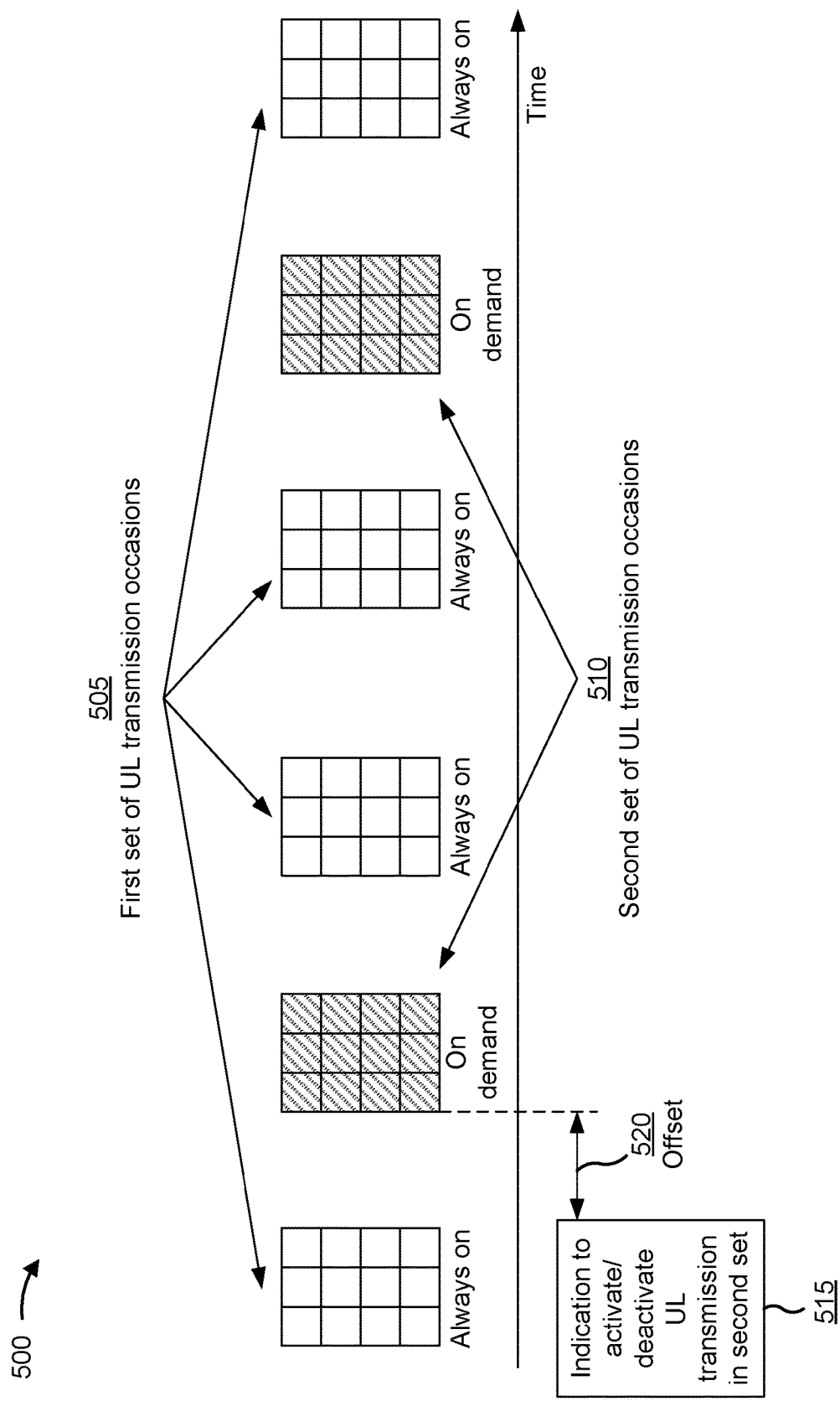
FIG. 5 is a diagram illustrating another example associated with configured grant uplink communication using dynamic resource pools, in accordance with the present disclosure.

FIG. 5 is a diagram illustrating an example 500 associated with configured grant uplink communication using dynamic resource pools, in accordance with the present disclosure. The example 500 shown in FIG. 5 is an example of a resource pool with resource deactivation. As shown in FIG. 5, the resource pool may be configured to include a first set of uplink transmission occasions 505 and a second set of uplink transmission occasions 510. The first set of uplink transmission occasions 505 may be always on uplink transmission occasions that cannot be dynamically deactivated. The second set of uplink transmission occasions 510 may be on demand uplink transmission occasions that can be dynamically activated or deactivated based at least in part on an indication received from a base station (e.g., base station 110).

In some aspects, the first set of uplink transmission occasions 505 may always be available for UEs (such as UE 120 and/or other UEs) to use for transmission of CG uplink communications (e.g., CG PUSCH transmission). The base station may transmit an indication 515 to one or more UEs to activate or deactivate uplink transmission in the second set of uplink transmission occasions 510. For example, if the base station determines that there are heavy collisions in first set of uplink transmission occasions 505 (e.g., there is a heavier uplink traffic load than the first set of uplink transmission occasions 505 can handle), the base station may transmit an indication to activate additional on demand uplink transmission occasions in the second set of uplink transmission occasions 510. If the base station determines that the first set of uplink transmission occasions 505 are underutilized, the base station may transmit an indication to deactivate the additional on demand uplink transmission occasions in the second set of uplink transmission occasions 510. In this case, the resources in the on demand uplink transmission occasions that are not activated can be used for other purposes, such as scheduled uplink and/or downlink communications.

The indication 515 to activate or deactivate uplink transmission in the second set of uplink transmission occasions 510 may be a single bit that indicates activation or deactivation of one or more uplink transmission occasions in the second set of uplink transmission occasions 510. For example, a bit field in a GC-PDCCH communication may be set to 1 to indicate activation of a target on demand uplink transmission occasion in the second set of uplink transmission occasions 510 and the bit field may be set to 0 to indicate deactivation of a target on demand uplink transmission occasion in the second set of uplink transmission occasions 510. In this case, a target on demand uplink transmission occasion in the second set of uplink transmission occasions 510 may be considered active if the GC-PDCCH communication is detected and the bit field is set to 1.

A time between reception of the indication 515 by the UE and a starting symbol of a target on demand uplink transmission occasion in the second set of uplink transmission occasions 510 that is activated or deactivated by the indication 515 may satisfy a threshold. For example, there may be a certain quantity of symbols/slots between reception of the indication 515 and the starting symbol of the target on demand uplink transmission occasion to allow UE processing time. The UE may identify the target on demand uplink transmission occasion in the second set of uplink transmission occasions 510 that is activated or deactivated by the indication 515 based at least in part on a time at which the indication is received. In some aspects, an offset 520 between the indication 515 and a target on demand uplink transmission occasion in the second set of uplink transmission occasions 510 may be used to identify the target on demand uplink transmission occasion that is activated or deactivated by the indication 515. For example, the indication may be transmitted at a fixed time or within a fixed range of times before the target on demand uplink transmission occasion that is activated or deactivated by the indication 515.

In some aspects, the second set of uplink transmission occasions 510, when activated, may be used as spill over resources for uplink traffic that could not be transmitted on the first set of uplink transmission occasions 505. The second set of uplink transmission occasions 510 may be configured with a restriction that an on demand uplink transmission occasion in the second set of uplink transmission occasions 510 may only be used by a UE if admission to the previous always on uplink transmission occasion in the first set of uplink transmission occasions 505 has failed for the UE. In this case, the UE may perform admission control to attempt to transmit a CG uplink communication on an always on uplink transmission occasion in the first set of uplink transmission occasions 505. If the UE determines that the admission has failed on the always on uplink transmission occasion in the first set of uplink transmission occasions 505, the UE transmits the CG uplink communication on the following on demand uplink communication transmission in the second set of uplink transmission occasions 510.

In some aspects, a first admission probability used by the UE to perform admission control for the first set of uplink transmission occasions 505 and a second admission probability may be used by the UE to perform admission control for the second set of uplink transmission occasions 510. For example, the second admission probability used to perform admission control for the second set of uplink transmission occasions 510 may be a higher than the first admission probability used to perform admission control for the first set of uplink transmission occasions 505. In some aspects, the first admission probability and the second admission probability may be separately configured or indicated by the base station. For example, the configuration or another message transmitted by the base station may indicate values for the first admission probability and the second admission probability. In some aspects, the second admission probability may be derived from the first admission probability. For example, if the first admission probability is p, the second admission probability may be calculated as $1-(1-p)*C$, with $0 \leq C \leq 1$. In this case, C may be hard coded or configured by the base station (e.g., by an RRC configuration and/or the like).

As indicated above, FIG. 5 is provided as an example. Other examples may differ from what is described with respect to FIG. 5.

Figure 6:
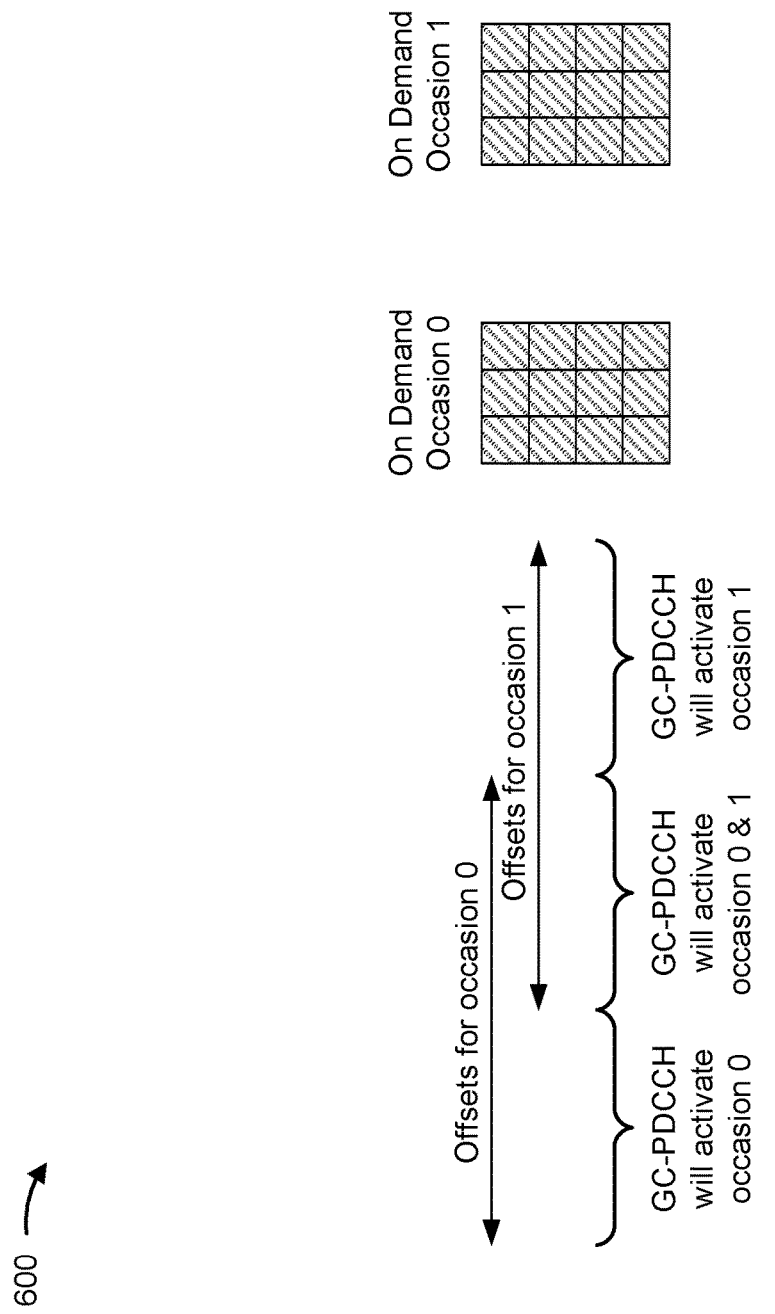
FIG. 6 is a diagram illustrating another example associated with configured grant uplink communication using dynamic resource pools, in accordance with the present disclosure.

FIG. 6 is a diagram illustrating an example 600 associated with configured grant uplink communication using dynamic resource pools, in accordance with the present disclosure. As shown in FIG. 6, example 600 shows activation of two on demand uplink transmission occasions (on demand occasion 0 and on demand occasion 1), using GC-PDCCH communications. On demand occasion 0 and on demand occasion 1 may be, for example, included in the second set of uplink transmission occasions 510 in the resource pool described above in connection with FIG. 5. As described above, a UE (e.g., UE 120) may be configured to monitor a bit field in GC-PDCCH communication for an indication that activates one or more on demand uplink transmission occasions. The bit field in the GC-PDCCH communication may act as an on/off indicator for one or more target on demand uplink transmission occasions. For example, the bit field may be set to 1 to activate the one or more target on demand uplink transmission occasions and may be set to 0 to deactivate the one or more target on demand uplink transmission occasions. In order to identify a target on demand uplink transmission occasion to be activated in response to the bit field in the GC-PDCCH communication, the GC-PDCCH communication may be transmitted at a fixed offset away (earlier) from the target on demand uplink transmission occasion or within a fixed range of offsets away from the target on demand uplink transmission occasion. A single offset may be simpler, but multiple offsets (e.g., a range of offsets) may allow for more scheduling flexibility for transmitting the GC-PDCCH communication.

As shown in FIG. 6, a range of offsets for on demand occasion 0 and a range offsets for on demand occasion 1 are defined. As further shown in FIG. 6, the range of offsets for on demand occasion 0 overlaps with the range offsets for on demand occasion 1. If a GC-PDCCH communication indicating activation of a target on demand uplink transmission occasion (e.g., bitfield set to 1) is detected by the UE in a range of offsets corresponding to a single on demand uplink transmission occasion, the single on demand uplink transmission occasion may be identified as the target on demand uplink transmission occasion to activate. For example, if the GC-PDCCH communication is detected in the range of offsets for on demand occasion 0, but outside of the range of offsets for on demand occasion 1, the UE may identify on demand occasion 0 as the target on demand uplink transmission occasion to activate. If the GC-PDCCH communication is detected in the range of offsets for on demand occasion 1, but outside of the range of offsets for on demand occasion 0, the UE may identify on demand occasion 1 as the target on demand uplink transmission occasion to activate.

In some aspects, if the GC-PDCCH communication is detected by the UE in overlapping ranges of offsets for multiple on demand uplink transmission occasions, the UE may identify all of the multiple on demand uplink transmission occasions associated with the overlapping ranges of offsets as target on demand uplink transmission occasions to activate. For example, as shown in FIG. 6, if the GC-PDCCH communication is detected in both the offset range for on demand occasion 0 and the offset range for on demand occasion 1, both on demand occasion 0 and on demand occasion 1 may be activated. Alternatively, in some aspects, if the GC-PDCCH communication is detected by the UE in overlapping ranges of offsets for two on demand uplink transmission occasions, the UE may activate the earlier on demand uplink transmission occasion.

As indicated above, FIG. 6 is provided as an example. Other examples may differ from what is described with respect to FIG. 6.

Figure 7:
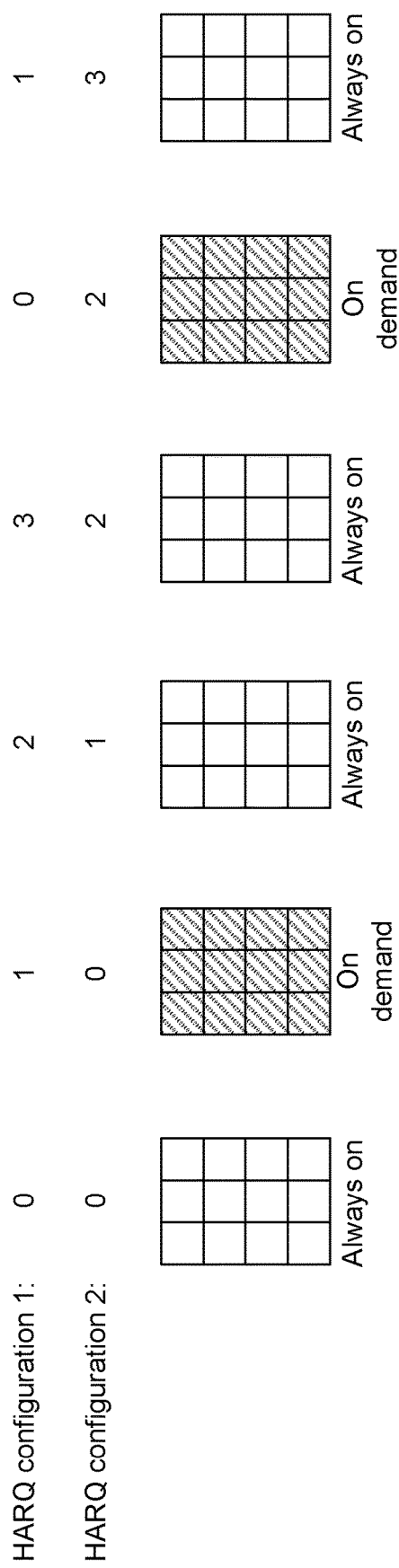
FIG. 7 is a diagram illustrating another example associated with configured grant uplink communication using dynamic resource pools, in accordance with the present disclosure.

FIG. 7 is a diagram illustrating an example 700 associated with configured grant uplink communication using dynamic resource pools, in accordance with the present disclosure. As shown in FIG. 7, example 700 shows two example configurations for determining hybrid automatic repeat request (HARQ) process identifiers for CG uplink communications using a resource pool including a set of always on uplink transmission occasions and a set of on demand uplink transmission occasions.

In CG uplink without a CG retransmission time configuration, the HARQ process identifier (HARQ ID) for a transmission instance may be determined by the slot/symbol time at which a CG uplink communication is transmitted. Assume that four HARQ IDs are allocated to CG uplink communications with an offset of 0. In that case, the HARQ IDs used for a series of CG uplink transmission occasions will be 0/1/2/3/0/1/2/3. . . . However, CG uplink transmission communication using the resource pool including the set of always on uplink transmission occasions and the set of on demand uplink transmission occasions may or may not include transmissions on the on demand uplink transmission occasions depending on whether the on demand transmission occasions are active or not.

As shown in FIG. 7, a first HARQ configuration (HARQ configuration 1) or a second HARQ configuration (HARQ configuration 2) may be used to determine HARQ IDs for CG uplink communications using the resource pool including the set of always on uplink transmission occasions and the set of on demand uplink transmission occasions. In HARQ configuration 1, the on demand uplink transmission occasions are assumed to be on when counting HARQ IDs. For example, as shown in FIG. 7, a series of transmission occasions including a first always on occasion, a first on demand occasion, a second always on occasion, a third always on occasion, a second on demand occasion, and a fourth always on occasion are allocated HARQ IDs of 0, 1, 2, 3, 0, and 1, respectively, using HARQ configuration 1. However, when on demand occasions are not activated, the HARQ IDs allocated to those on demand occasions may be wasted in HARQ configuration 1.

In HARQ configuration 2, the on-demand uplink transmission occasions are assumed to be deactivated and the HARQ ID if an on demand uplink transmission occasion is the same as the HARQ ID of an always on uplink transmission occasion immediately prior to the on demand uplink transmission occasion. For example, as shown in FIG. 7, in HARQ configuration 2, the first on demand occasion is allocated the same HARQ ID as the first always on occasion and the second on demand occasion is allocated the same HARQ ID as the third always on occasion. Accordingly, using HARQ configuration 2, the series of transmission occasions in FIG. 7 including the first always on occasion, the first on demand occasion, the second always on occasion, the third always on occasion, the second on demand occasion, and the fourth always on occasion are allocated HARQ IDs of 0, 0, 1, 2, 2, and 3, respectively. HARQ configuration 2 is effective when the on demand occasions are supplemental for the always on occasions, as a UE will not transmit a CG uplink communication in both an always on occasion and an immediately subsequent on demand occasion.

As indicated above, FIG. 7 is provided as an example. Other examples may differ from what is described with respect to FIG. 7.

Figure 8:
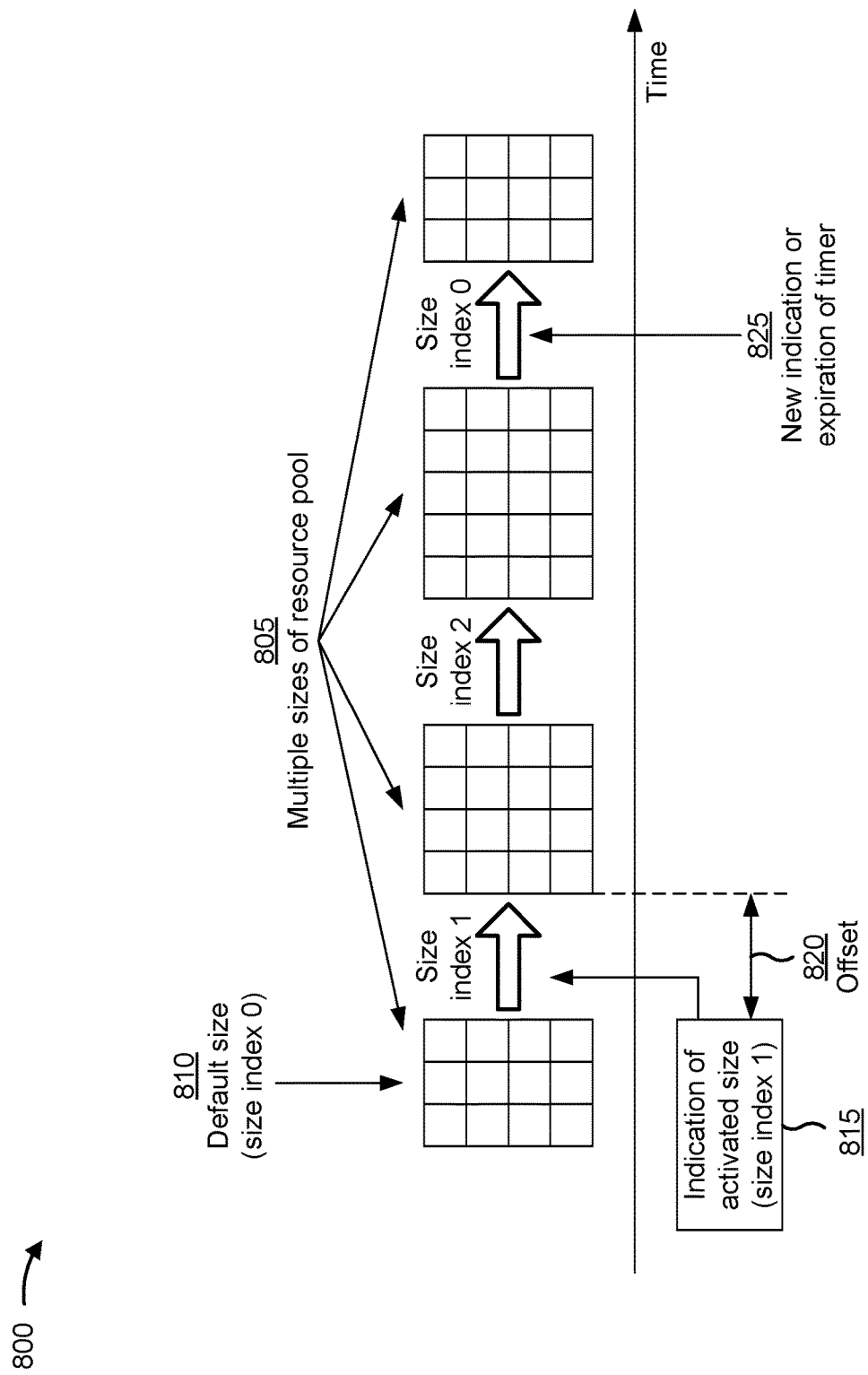
FIG. 8 is a diagram illustrating another example associated with configured grant uplink communication using dynamic resource pools, in accordance with the present disclosure.

FIG. 8 is a diagram illustrating an example 800 associated with configured grant uplink communication using dynamic resource pools, in accordance with the present disclosure. As shown in FIG. 8, example 800 is an example of a resource pool with variable sizes. For example, the resource pool may be configured with variable sizes in the time domain, frequency domain, spatial domain, and/or the like. As shown in FIG. 8, the configuration of the resource pool may configure multiple sizes 805 of the resource pool. The size of the resource pool can be adjusted between the multiple sizes 805 depending on dynamic downlink signaling from a base station (e.g., base station 110). The configuration may also indicate a default size 810 of the multiple sizes 805 of the resource pool.

The resource pool may start in the default size 810 configuration. At a given time, UEs (e.g., UE 120 and/or other UEs) may use a current size of the resource pool for CG uplink transmission (e.g., CG PUSCH transmission). If the base station determines there are heavy collisions in the resource pool (e.g., there is a heavier UL traffic load than the current size resource pool can handle), the base station may transmit an indication 815 of an activated size to select an activated size that is larger than the current size from the multiple sizes 805 configured for the resource pool. If the base station determines that the current size resource pool is underutilized, the base station may transmit an indication 815 of an activated size to select an activated size that is smaller than the current size from the multiple sizes 805 configured for the resource pool. In this case, resources freed up by reducing the size of the resource pool may be used for other purposes, such as scheduled uplink and/or downlink communications.

In some aspects, a time between reception of the indication 815 of an activated size and a starting symbol of an uplink transmission occasion, included in the resource pool, to which the activated size is applied may satisfy a threshold. For example, the activated size may take effect in an uplink transmission occasion in the resource pool that begins at least a certain quantity of symbol/slots after the indication 815 is received by the UE. As shown in FIG. 8, there may be an offset 820 between the indication 815 of the activated size and the uplink transmission occasion to which the activated size is applied.

As shown in FIG. 8, the multiple sizes 805 configured for the resource pool may be associated with respective size indexes. For example, the default size 810 may be associated with a size index of 0. The indication 815 of the activated size may include an indication of the size index associated with the activated size selected by the indication 815. For example, in FIG. 8, the indication 815 of the activated size indicates a size index of 1, and in response to receiving this indication 815, the size of the resource pool may be adjusted from the default size 810 to a size associated with size index 1 of the multiple sizes 805 configured for the resource pool.

The UE may be configured to monitor a bit field in a GC-PDCCH communication, and the indication 815 of the activated size may be a bit in the bit field of a GC-PDCCH communication that indicates the size index for the activated size selected from the multiple sizes 805 configured for the resource pool. The bit field may indicate a size index associated with an activated size to take affect at a next uplink transmission occasion in the resource pool. In some aspects, sizes can be selected/adjusted in multiple variable size resource pools using the same bit field in a GC-PDCCH communication. In some aspects, sizes can be selected/adjusted in multiple variable size resource pools using different bit fields in the same GC-PDCCH communication and/or in different GC-PDCCH communications.

As shown in FIG. 8, in response to a new indication or expiration of a timer 825, the size of the resource pool may be returned to a default size. In some aspects, the indication 815 of the activated size may be "sticky," such that the resource pool remains at the activated size selected for the resource pool until the activated size is updated or changed by another indication. In some aspects, a timer may be started in response to the indication 815 which selects a size other than the default size 810 for the resource pool, and expiration of the timer may trigger a return to the default size 810 for the resource pool if no additional indication (e.g., GC-PDCCH communication) is transmitted.

As indicated above, FIG. 8 is provided as an example. Other examples may differ from what is described with respect to FIG. 8.

Figure 9:
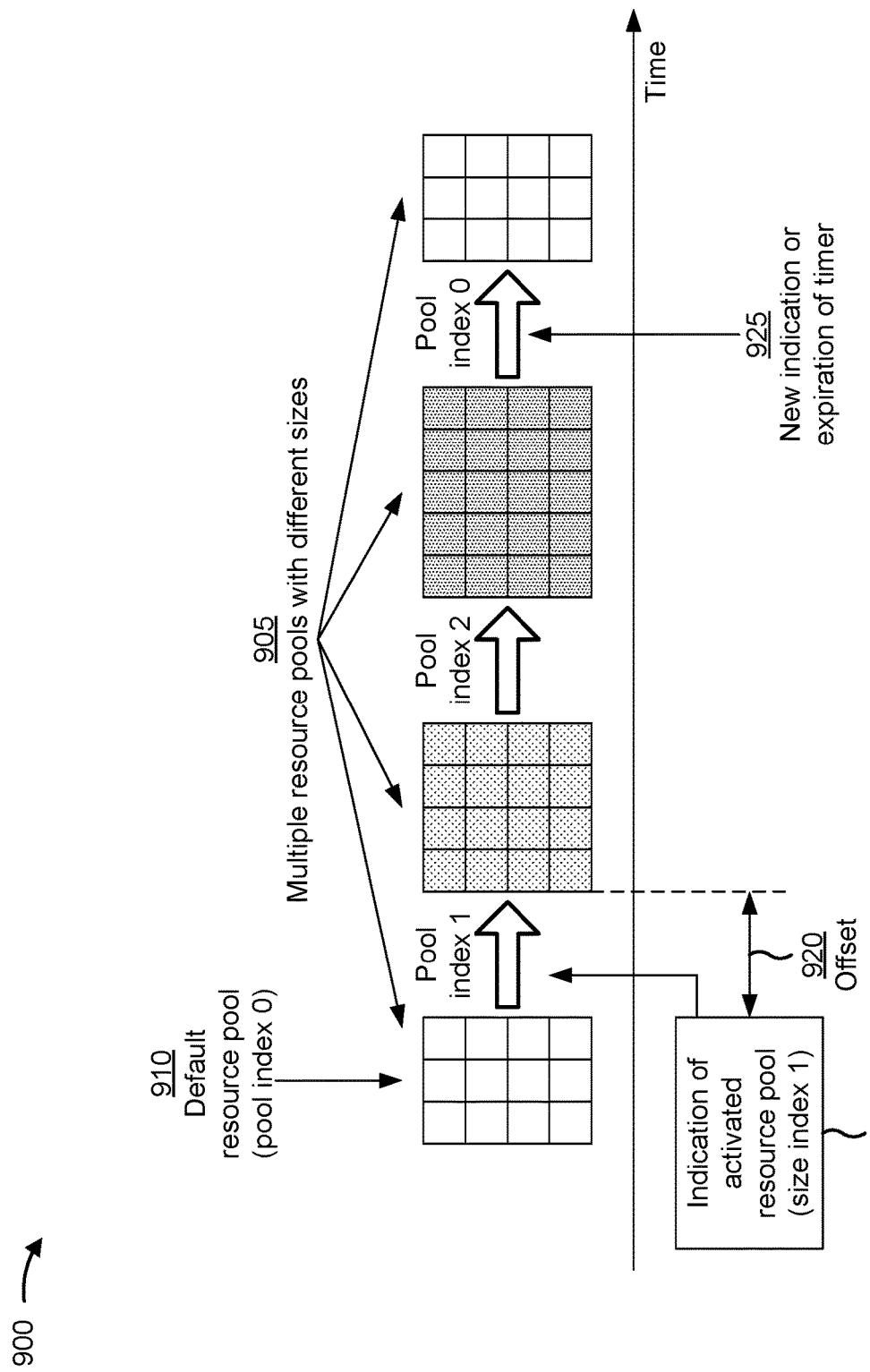
FIG. 9 is a diagram illustrating another example associated with configured grant uplink communication using dynamic resource pools, in accordance with the present disclosure.

FIG. 9 is a diagram illustrating an example 900 associated with configured grant uplink communication using dynamic resource pools, in accordance with the present disclosure. As shown in FIG. 9, example 900 is an example of multiple resource pools 905 with different sizes. A configuration may configure the multiple resource pools 905 with different sizes for CG uplink transmission. For example, the multiple resource pools 905 may be configured with different sizes in the time domain, frequency domain, spatial domain, and/or the like. Dynamic downlink signaling from a base station (e.g., base station 110) may be used to select a resource pool from the multiple resource pools 905 with different sizes.

The configuration of the multiple resource pools 905 may indicate a resource pool 910 of the multiple resource pools 905 with different sizes.

The default resource pool 910 may be used in a case in which no indication has been received that selects a different resource pool of the multiple resource pools 905. At a given time, UEs (e.g., UE 120 and/or other UEs) may use a resource pool for CG uplink transmission (e.g., CG PUSCH transmission). If the base station determines there are heavy collisions in the resource pool (e.g., there is a heavier UL traffic load than the current resource pool can handle), the base station may transmit an indication 915 of an activated resource pool to select an activated resource pool with a larger size than the current resource pool from the multiple resource pools 905 with different sizes. If the base station determines that the current resource pool is underutilized, the base station may transmit an indication 915 of an activated resource pool to select an activated resource pool with a smaller size than the current resource pool from the multiple resource pools 905 with different sizes. In this case, resources freed up by switching to a different resource pool may be used for other purposes, such as scheduled uplink and/or downlink communications.

In some aspects, a time between reception of the indication 915 of an activated resource pool and a starting symbol of an uplink transmission occasion included in the resource pool activated by the indication 915 may satisfy a threshold. For example, the switching command to switch to the activated resource pool may take effect at least a certain quantity of symbols/slots after the indication 915 is received by the UE. As shown in FIG. 9, there may be an offset 920 between the indication 915 of the activated resource pool and a first uplink transmission occasion in the newly selected activated resource pool.

As shown in FIG. 9, the multiple resource pools 905 with different sizes may be associated with respective pool indexes. For example, the default resource pool 910 may be associated with a pool index of 0. The indication 915 of the activated resource pool may include an indication of the pool index associated with the activated resource pool selected by the indication 915. For example, in FIG. 9, the indication 915 of the activated resource pool indicates a pool index of 1, and in response to receiving this indication 915, the activated resource pool may be switched from the default resource pool 910 to the resource pool associated with pool index 1 of the multiple resource pools 905.

The UE may be configured to monitor a bit field in a GC-PDCCH communication, and the indication 915 of the activated resource pool may be a bit in the bit field of a GC-PDCCH communication that indicates the pool index for the activated resource pool selected from the multiple resource pools 905. When the bit field indicates the pool index for the activated resource pool (e.g., the resource pool to be activated), the other resource pools in the multiple resource pools 905 (including a previously activated resource pool) may be automatically deactivated and the selected activated resource pool will be activated starting from the next uplink transmission occasion in the activated resource pool.

As shown in FIG. 9, in response to a new indication or expiration of a timer 925, the current activated pool may be switched back to default resource pool 910. In some aspects, the indication 915 of the activated resource pool may be "sticky," such that selected activated resource pool remains as the activated resource pool for until another activated resource pool is selected in another indication. In some aspects, a timer may be started in response to the indication 915 which selects an activated resource pool other than the default resource pool 910, and expiration of the timer may trigger a switch back to the default resource pool 910 if no additional indication (e.g., GC-PDCCH communication) is transmitted.

As indicated above, FIG. 9 is provided as an example. Other examples may differ from what is described with respect to FIG. 9.

Figure 10:
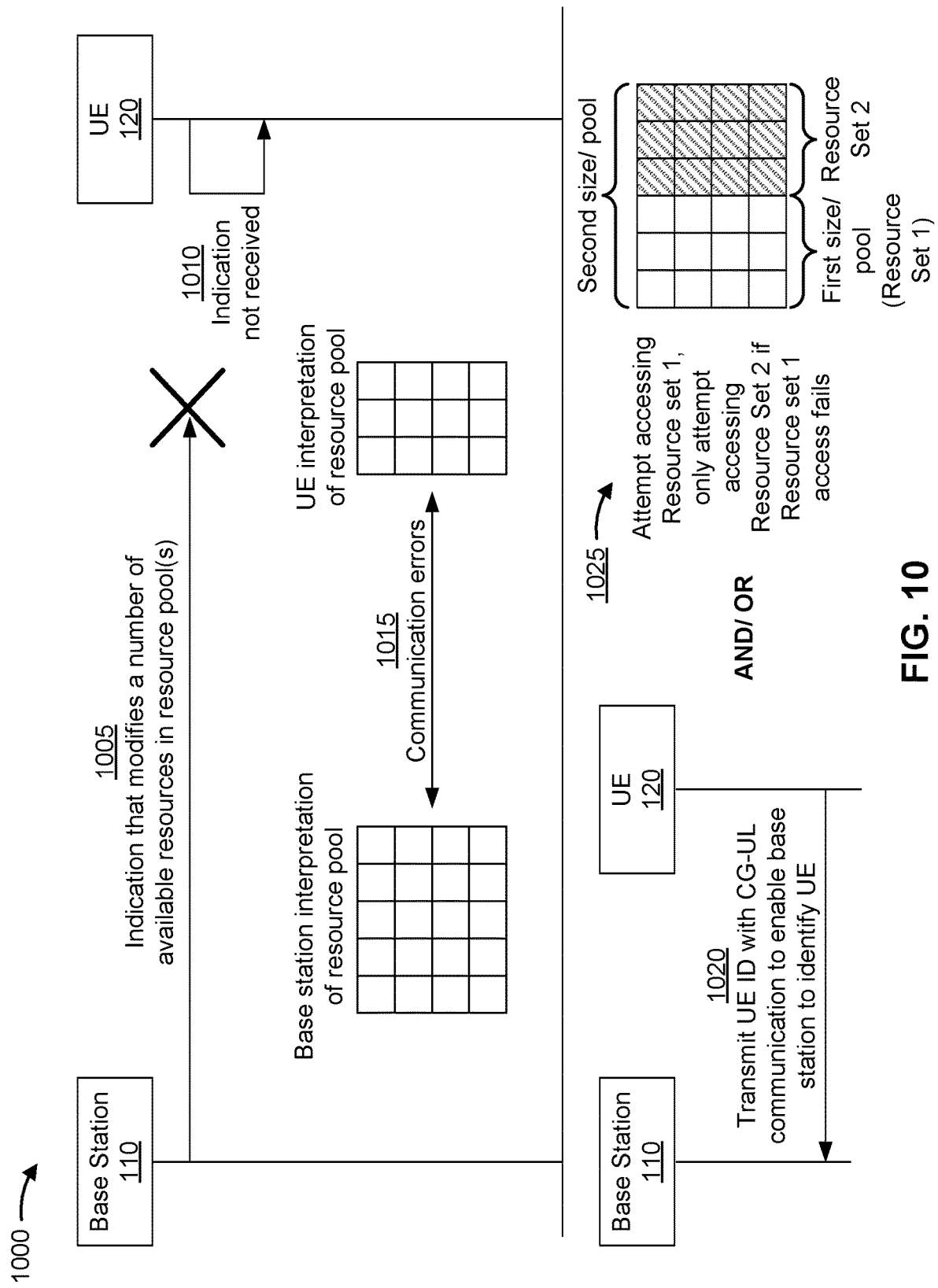
FIG. 10 is a diagram illustrating another example associated with configured grant uplink communication using dynamic resource pools, in accordance with the present disclosure.

FIG. 10 is a diagram illustrating an example 1000 associated with configured grant uplink communication using dynamic resource pools, in accordance with the present disclosure. As shown in FIG. 10, a base station 110 and a UE 120 may communicate with one another.

As shown in FIG. 10, and by reference number 1005, the base station 110 transmits an indication that modifies a number of available resources in one or more resource pools configured for CG uplink communications. For example, the indication may include an indication to activate/deactivate one or more on demand uplink transmission occasions, an indication to select a size from multiple sizes of a resource pool, and/or an indication to select a resource pool from multiple resource pools with different sizes. The indication may be transmitted in a GC-PDCCH communication.

As further shown in FIG. 10, and by reference number 1010, the UE 120 may not receive the indication transmitted by the base station 110. For example, a GC-PDCCH including the indication may not be properly detected due to decoding failure.

As further shown in FIG. 10, and by reference number 1015, there may be communication errors between the UE 120 and the base station 110. Because the indication modifying the number of available resources in the resource pool(s) was not received by the UE 120, the base station 110 and the UE 120 may have different interpretations of the resource pool for CG uplink communications. For example, in cases in which the indication modifies the size of the resource pool and/or selects a different resource pool having a different size, the base station 110 and the UE 120 may have a misunderstanding regarding a current configuration of the resource pool.

When the UE 120 attempts to transmit a CG uplink communication to the base station 110, the UE 120 may pseudo-randomly select a resource in the resource pool (e.g., using a UE-specific hashing function) to transmit the CG uplink communication. If the base station 110 and the UE 120 have the same understanding of the resource pool structure, the base station 110 will know which resource the UE 120 will pick for transmitting the CG uplink communication. However, if the base station 110 and the UE 120 have different understandings of the resource pool structure, the base station 110 will not know which resource the UE 120 will pick for transmitting the CG uplink communication.

As further shown in FIG. 10, and by reference number 1020, the UE 120 may transmit a UE ID with a CG uplink communication to enable the base station 110 to identify the UE 120. The base station 110 can perform blind decoding over the resources in the resource pool under different resource pool hypotheses, and thus, may identify which UE is transmitting on a resource from the blind decoding results based at least in part on the UE ID transmitted by the UE 120 with the CG uplink communication. Accordingly, this may enable the base station 110 to identify which UE is transmitting a CG uplink communication on a resource in the resource pool even if there is a misunderstanding between the base station 110 and the UE 120 regarding the resource pool structure.

As further shown in FIG. 10, and by reference number 1025, a nested structure in the resource pool may be used for CG uplink communication. For example, a first size/pool may be a subset of a second size/pool. A first resource set (resource set 1) may be defined by the first size/pool and a second resource set may be defined by resources included in the second size/pool but not included in the resource set 1. The UE 120 may attempt accessing resource set 1, for example by performing UE-specific hashing over resource set 1. In response to a determination that accessing resource set 1 failed, the UE 120 may then attempt accessing resource set 2, for example by performing UE-specific hashing over the resources in resource set 2. In this way, even if the UE 120 misunderstands which size/resource pool (e.g., the first size/pool or the second size/pool) is currently being used by the base station 110, the hashing may at least be correct on the first size/pool. The nested structure may be used in addition to and/or as an alternative to the UE 120 transmitting the UE ID with CG UL communication.

As indicated above, FIG. 10 is provided as an example. Other examples may differ from what is described with respect to FIG. 10.

Figure 11:
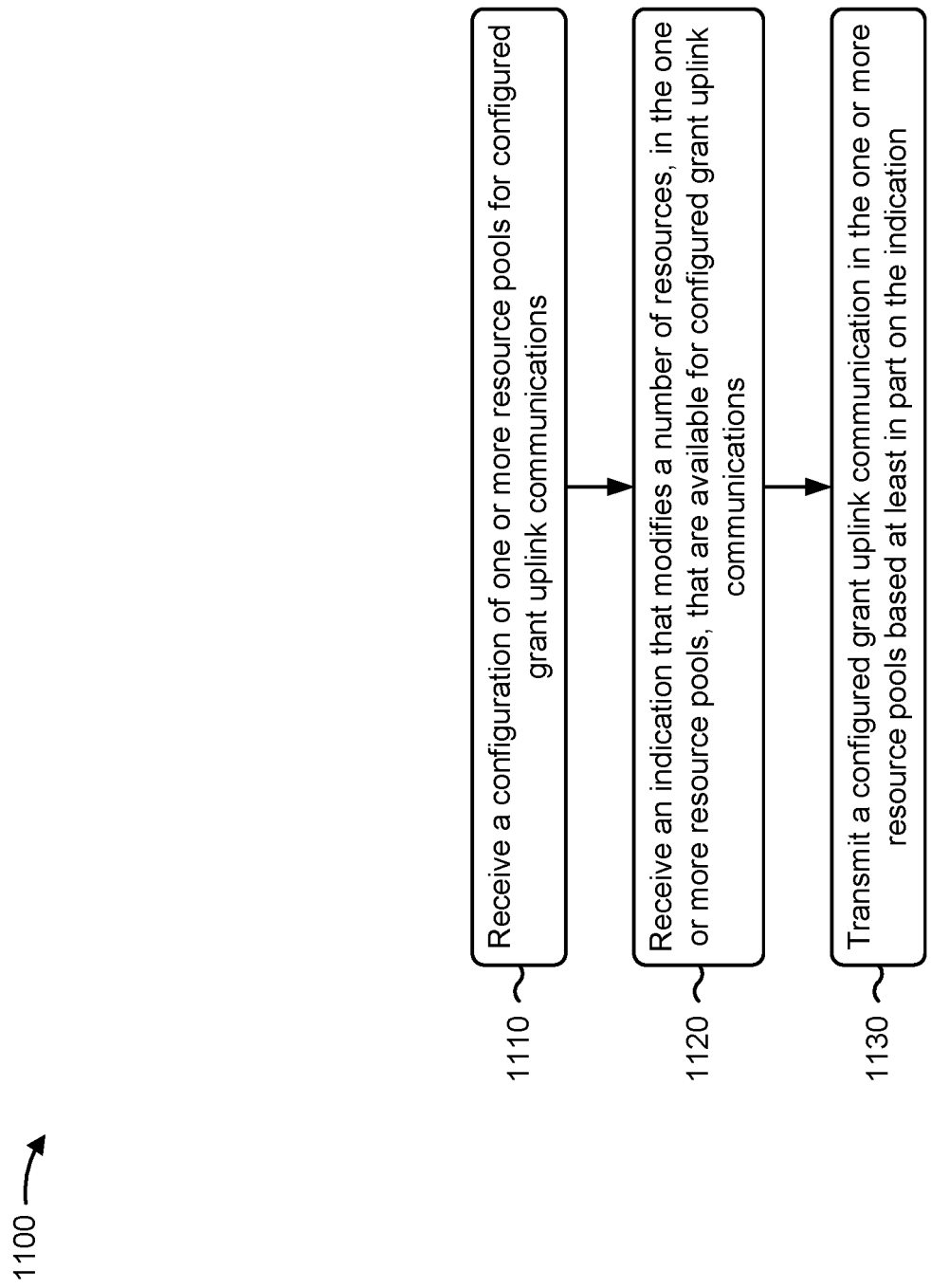
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120 and/or the like) performs operations associated with configured grant uplink communication using dynamic resource pools.

As shown in FIG. 11, in some aspects, process 1100 may include receiving a configuration of one or more resource pools for configured grant uplink communications (block 1110). For example, the user equipment (e.g., using receive processor 258, transmit processor 264, controller/processor 280, memory 282, and/or the like) may receive a configuration of one or more resource pools for configured grant uplink communications, as described above.

As further shown in FIG. 11, in some aspects, process 1100 may include receiving an indication that modifies a number of resources, in the one or more resource pools, that are available for configured grant uplink communications (block 1120). For example, the user equipment (e.g., using receive processor 258, transmit processor 264, controller/processor 280, memory 282, and/or the like) may receive an indication that modifies a number of resources, in the one or more resource pools, that are available for configured grant uplink communications, as described above.

As further shown in FIG. 11, in some aspects, process 1100 may include transmitting a configured grant uplink communication in the one or more resource pools based at least in part on the indication (block 1130). For example, the user equipment (e.g., using receive processor 258, transmit processor 264, controller/processor 280, memory 282, and/or the like) may transmit a configured grant uplink communication in the one or more resource pools based at least in part on the indication, as described above.

Process 1100 may include additional aspects, such as any single aspect or any combination of aspects described below and/or in connection with one or more other processes described elsewhere herein.

In a first aspect, the configuration indicates a first set of uplink transmission occasions, in a resource pool of the one or more resource pools, that are activated by default, and a second set of uplink transmission occasions, in the resource pool, that are deactivated by default.

In a second aspect, alone or in combination with the first aspect, the first set of uplink transmission occasions are always activated and cannot be dynamically deactivated, and wherein the second set of uplink transmission occasions can be dynamically activated or deactivated.

In a third aspect, alone or in combination with one or more of the first and second aspects, a time between reception of the indication and a starting symbol of the second set of uplink transmission occasions satisfies a threshold.

In a fourth aspect, alone or in combination with one or more of the first through third aspects, transmitting the configured grant uplink communication comprises: attempting transmission of the configured grant uplink communication in the first set of uplink transmission occasions; determining that transmission of the configured grant uplink communication in the first set of uplink transmission occasions has failed, and transmitting the configured grant uplink communication in the second set of uplink transmission occasions based at least in part on determining that transmission of the configured grant uplink communication in the first set of uplink transmission occasions has failed.

In a fifth aspect, alone or in combination with one or more of the first through fourth aspects, the second set of uplink transmission occasions is available for transmission of the configured grant uplink communication only if transmission of the configured grant uplink communication in the first set of uplink transmission occasions fails.

In a sixth aspect, alone or in combination with one or more of the first through fifth aspects, the indication activates or deactivates one or more uplink transmission occasions included in the second set of uplink transmission occasions.

In a seventh aspect, alone or in combination with one or more of the first through sixth aspects, the indication is a single bit that indicates activation or deactivation of one or more uplink transmission occasions included in the second set of uplink transmission occasions.

In an eighth aspect, alone or in combination with one or more of the first through seventh aspects, the indication occurs at a fixed time or within a fixed range of times before an uplink transmission occasion that is activated or deactivated by the indication.

In a ninth aspect, alone or in combination with one or more of the first through eighth aspects, the indication occurs within a first time range corresponding to a first uplink transmission occasion, of the second set of uplink transmission occasions, and within a second time range corresponding to a second uplink transmission occasion of the second set of uplink transmission occasions, and wherein the indication activates one of: an earlier-occurring occasion of the first uplink transmission occasion and the second uplink transmission occasion, or both the first uplink transmission occasion and the second uplink transmission occasion.

In a tenth aspect, alone or in combination with one or more of the first through ninth aspects, process 1100 includes identifying an uplink transmission occasion, included in the second set of uplink transmission occasions, that is activated by the indication based at least in part on a time at which the indication is received.

In an eleventh aspect, alone or in combination with one or more of the first through tenth aspects, the first set of uplink transmission occasions is associated with a first admission probability parameter that is different from a second admission probability parameter associated with the second set of uplink transmission occasions.

In a twelfth aspect, alone or in combination with one or more of the first through eleventh aspects, the configuration or another message indicates the first admission probability parameter and the second admission probability parameter.

In a thirteenth aspect, alone or in combination with one or more of the first through twelfth aspects, the second admission probability parameter is derived from the first admission probability parameter.

In a fourteenth aspect, alone or in combination with one or more of the first through thirteenth aspects, process 1100 includes determining a hybrid automatic repeat request (HARQ) process identifier for the configured grant uplink communication based at least in part on an assumption that the second set of uplink transmission occasions is activated, wherein a HARQ process identifier is associating with a transmission occasion in the second set of uplink transmission occasions is different from a HARQ process identifier associated with a transmission occasion, in the first set of uplink transmission occasions, that occurs immediately prior to the transmission occasion in the second set of uplink transmission occasions.

In a fifteenth aspect, alone or in combination with one or more of the first through fourteenth aspects, process 1100 includes determining a HARQ process identifier for the configured grant uplink communication based at least in part on an assumption that the second set of uplink transmission occasions is deactivated, wherein a HARQ process identifier is associating with a transmission occasion in the second set of uplink transmission occasions is a same HARQ process identifier associated with a transmission occasion, in the first set of uplink transmission occasions, that occurs immediately prior to the transmission occasion in the second set of uplink transmission occasions.

In a sixteenth aspect, alone or in combination with one or more of the first through fifteenth aspects, the configuration indicates multiple sizes of a resource pool of the one or more resource pools, and wherein the indication indicates an activated size, of the multiple sizes, for the resource pool.

In a seventeenth aspect, alone or in combination with one or more of the first through sixteenth aspects, the configuration indicates a default size of the multiple sizes, and wherein the indication modifies the default size.

In an eighteenth aspect, alone or in combination with one or more of the first through seventeenth aspects, a time between reception of the indication and a starting symbol of an uplink transmission occasion, included in the resource pool, to which the activated size applies satisfies a threshold.

In a nineteenth aspect, alone or in combination with one or more of the first through eighteenth aspects, the indication is an index value that corresponds to a size of the multiple sizes.

In a twentieth aspect, alone or in combination with one or more of the first through nineteenth aspects, the activated size applies to subsequent uplink transmission occasions until at least one of: reception of a new indication that indicates a different size than the activated size, expiration of a timer that triggers a return to a default size, or a combination thereof.

In a twenty-first aspect, alone or in combination with one or more of the first through twentieth aspects, the multiple sizes of the resource pool include a first size and a second size, wherein the first size is a subset of the second size.

In a twenty-second aspect, alone or in combination with one or more of the first through twenty first aspects, process 1100 includes determining that access has failed for a first set of resources associated with the second size, wherein the first is setting of resources is the same as an entire set of resources associated with the first size; and attempting access using a second set of resources associated with the second size based at least in part on determining that access has failed for the first set of resources associated with the second size, wherein the second is setting of resources is not included in the entire set of resources associated with the first size.

In a twenty-third aspect, alone or in combination with one or more of the first through twenty-second aspects, the configuration indicates multiple resource pools that have different sizes, and wherein the indication indicates a resource pool of the multiple resource pools.

In a twenty-fourth aspect, alone or in combination with one or more of the first through twenty-third aspects, the configuration indicates a default resource pool of the multiple resource pools.

In a twenty-fifth aspect, alone or in combination with one or more of the first through twenty-fourth aspects, a time between reception of the indication and a starting symbol of an uplink transmission occasion, included in a resource pool activated by the indication, satisfies a threshold.

In a twenty-sixth aspect, alone or in combination with one or more of the first through twenty-fifth aspects, the indication is an index value that corresponds to a resource pool of the multiple resource pools.

In a twenty-seventh aspect, alone or in combination with one or more of the first through twenty-sixth aspects, the indication activates a resource pool, of the multiple resource pools, until at least one of: reception of a new indication that indicates a different resource pool than the resource pool activated by the indication, expiration of a timer that triggers a return to a default resource pool, or a combination thereof.

In a twenty-eighth aspect, alone or in combination with one or more of the first through twenty-seventh aspects, the multiple resource pools includes a first resource pool and a second resource pool, wherein the first resource pool is a subset of the second resource pool.

In a twenty-ninth aspect, alone or in combination with one or more of the first through twenty-eighth aspects, process 1100 includes determining that access has failed for a first set of resources included in the second resource pool, wherein the first is setting of resources is the same as an entire set of resources included in the first resource pool; and attempting access using a second set of resources included in the second resource pool based at least in part on determining that access has failed for the first set of resources included in the second resource pool, wherein the second is setting of resources is not included in the entire set of resources included in the first resource pool.

In a thirtieth aspect, alone or in combination with one or more of the first through twenty-ninth aspects, the indication is included in a group common physical downlink control channel (GC-PDCCH) communication.

In a thirty-first aspect, alone or in combination with one or more of the first through thirtieth aspects, the configuration indicates a bit field, of the GC-PDCCH communication, to be monitored by the UE to receive the indication.

In a thirty-second aspect, alone or in combination with one or more of the first through thirty-first aspects, process 1100 includes transmitting configured grant uplink control information, that includes an identifier of the UE, in association with the configured grant uplink communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
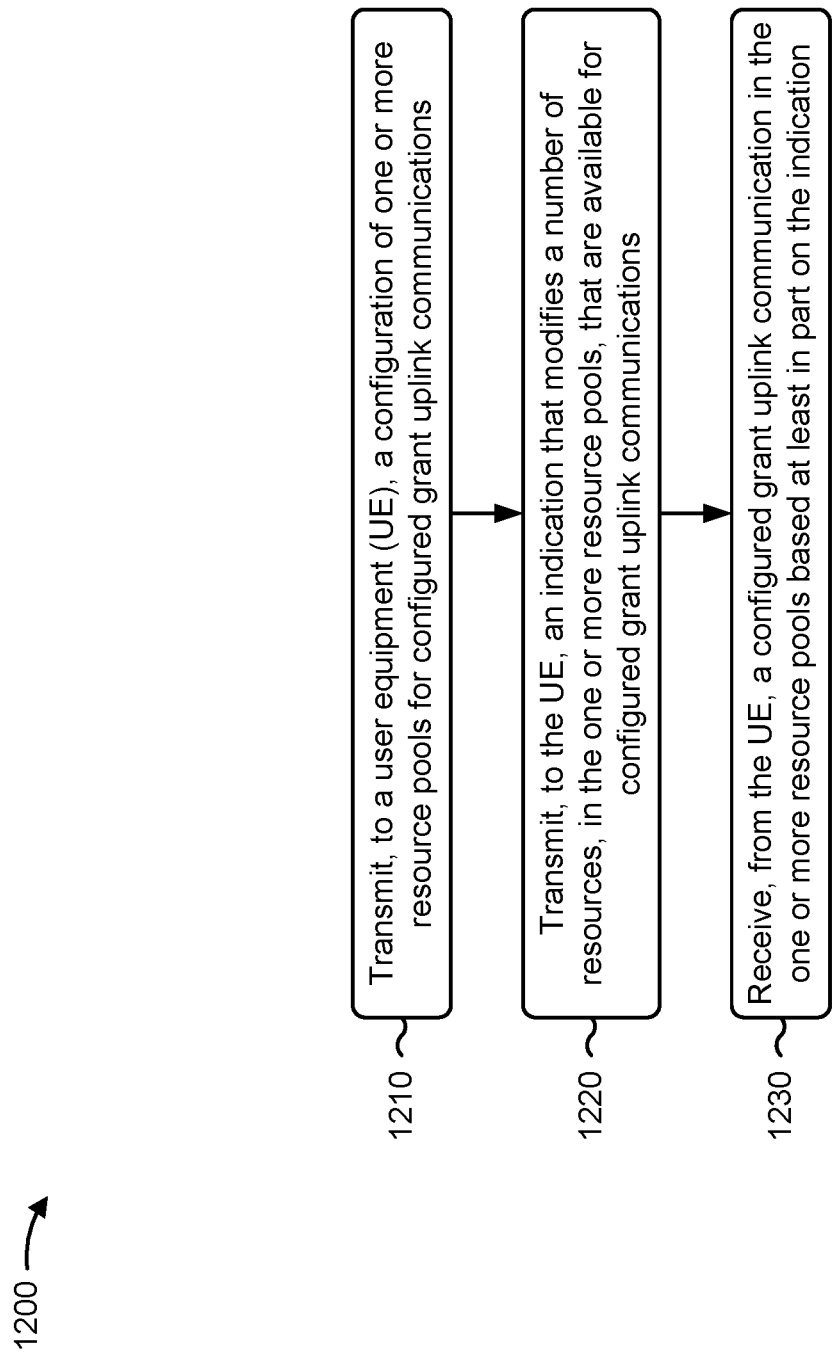
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110 and/or the like) performs operations associated with configured grant uplink communication using dynamic resource pools.

As shown in FIG. 12, in some aspects, process 1200 may include transmitting, to a UE, a configuration of one or more resource pools for configured grant uplink communications (block 1210). For example, the base station (e.g., using transmit processor 220, receive processor 238, controller/processor 240, memory 242, and/or the like) may transmit, to a UE, a configuration of one or more resource pools for configured grant uplink communications, as described above.

As further shown in FIG. 12, in some aspects, process 1200 may include transmitting, to the UE, an indication that modifies a number of resources, in the one or more resource pools, that are available for configured grant uplink communications (block 1220). For example, the base station (e.g., using transmit processor 220, receive processor 238, controller/processor 240, memory 242, and/or the like) may transmit, to the UE, an indication that modifies a number of resources, in the one or more resource pools, that are available for configured grant uplink communications, as described above.

As further shown in FIG. 12, in some aspects, process 1200 may include receiving, from the UE, a configured grant uplink communication in the one or more resource pools based at least in part on the indication (block 1230). For example, the base station (e.g., using transmit processor 220, receive processor 238, controller/processor 240, memory 242, and/or the like) may receive, from the UE, a configured grant uplink communication in the one or more resource pools based at least in part on the indication, as described above.

Process 1200 may include additional aspects, such as any single aspect or any combination of aspects described below and/or in connection with one or more other processes described elsewhere herein.

In a first aspect, the indication that modifies the number of resources is transmitted based at least in part on a determination of whether uplink traffic satisfies a threshold.

In a second aspect, alone or in combination with the first aspect, the configuration indicates a first set of uplink transmission occasions, in a resource pool of the one or more resource pools, that are activated by default, and a second set of uplink transmission occasions, in the resource pool, that are deactivated by default.

In a third aspect, alone or in combination with one or more of the first and second aspects, the first set of uplink transmission occasions are always activated and cannot be dynamically deactivated, and wherein the second set of uplink transmission occasions can be dynamically activated or deactivated.

In a fourth aspect, alone or in combination with one or more of the first through third aspects, a time between transmission of the indication and a starting symbol of the second set of uplink transmission occasions satisfies a threshold.

In a fifth aspect, alone or in combination with one or more of the first through fourth aspects, the second set of uplink transmission occasions is available for transmission of the configured grant uplink communication only if transmission of the configured grant uplink communication in the first set of uplink transmission occasions fails.

In a sixth aspect, alone or in combination with one or more of the first through fifth aspects, the indication activates or deactivates one or more uplink transmission occasions included in the second set of uplink transmission occasions.

In a seventh aspect, alone or in combination with one or more of the first through sixth aspects, the indication is a single bit that indicates activation or deactivation of one or more uplink transmission occasions included in the second set of uplink transmission occasions.

In an eighth aspect, alone or in combination with one or more of the first through seventh aspects, the indication occurs at a fixed time or within a fixed range of times before an uplink transmission occasion that is activated or deactivated by the indication.

In a ninth aspect, alone or in combination with one or more of the first through eighth aspects, the indication occurs within a first time range corresponding to a first uplink transmission occasion, of the second set of uplink transmission occasions, and within a second time range corresponding to a second uplink transmission occasion of the second set of uplink transmission occasions, and the indication activates one of: an earlier-occurring occasion of the first uplink transmission occasion and the second uplink transmission occasion, or both the first uplink transmission occasion and the second uplink transmission occasion.

In a tenth aspect, alone or in combination with one or more of the first through ninth aspects, the indication identifies an uplink transmission occasion, included in the second set of uplink transmission occasions, that is activated by the indication based at least in part on a time at which the indication is transmitted.

In an eleventh aspect, alone or in combination with one or more of the first through tenth aspects, the first set of uplink transmission occasions is associated with a first admission probability parameter that is different from a second admission probability parameter associated with the second set of uplink transmission occasions.

In a twelfth aspect, alone or in combination with one or more of the first through eleventh aspects, the configuration or another message indicates the first admission probability parameter and the second admission probability parameter.

In a thirteenth aspect, alone or in combination with one or more of the first through twelfth aspects, the second admission probability parameter is derived from the first admission probability parameter.

In a fourteenth aspect, alone or in combination with one or more of the first through thirteenth aspects, the configuration indicates multiple sizes of a resource pool of the one or more resource pools, and wherein the indication indicates an activated size, of the multiple sizes, for the resource pool.

In a fifteenth aspect, alone or in combination with one or more of the first through fourteenth aspects, the configuration indicates a default size of the multiple sizes, and wherein the indication modifies the default size.

In a sixteenth aspect, alone or in combination with one or more of the first through fifteenth aspects, a time between transmission of the indication and a starting symbol of an uplink transmission occasion, included in the resource pool, to which the activated size applies satisfies a threshold.

In a seventeenth aspect, alone or in combination with one or more of the first through sixteenth aspects, the indication is an index value that corresponds to a size of the multiple sizes.

In an eighteenth aspect, alone or in combination with one or more of the first through seventeenth aspects, the activated size applies to subsequent uplink transmission occasions until at least one of: transmission of a new indication that indicates a different size than the activated size, expiration of a timer that triggers a return to a default size, or a combination thereof.

In a nineteenth aspect, alone or in combination with one or more of the first through eighteenth aspects, the multiple sizes of the resource pool include a first size and a second size, wherein the first size is a subset of the second size.

In a twentieth aspect, alone or in combination with one or more of the first through nineteenth aspects, the configuration indicates multiple resource pools that have different sizes, and wherein the indication indicates a resource pool of the multiple resource pools.

In a twenty-first aspect, alone or in combination with one or more of the first through twentieth aspects, the configuration indicates a default resource pool of the multiple resource pools.

In a twenty-second aspect, alone or in combination with one or more of the first through twenty-first aspects, a time between transmission of the indication and a starting symbol of an uplink transmission occasion, included in a resource pool activated by the indication, satisfies a threshold.

In a twenty-third aspect, alone or in combination with one or more of the first through twenty-second aspects, the indication is an index value that corresponds to a resource pool of the multiple resource pools.

In a twenty-fourth aspect, alone or in combination with one or more of the first through twenty-third aspects, the indication activates a resource pool, of the multiple resource pools, until at least one of: transmission of a new indication that indicates a different resource pool than the resource pool activated by the indication, expiration of a timer that triggers a return to a default resource pool, or a combination thereof.

In a twenty-fifth aspect, alone or in combination with one or more of the first through twenty-fourth aspects, the multiple resource pools includes a first resource pool and a second resource pool, wherein the first resource pool is a subset of the second resource pool.

In a twenty-sixth aspect, alone or in combination with one or more of the first through twenty-fifth aspects, the indication is included in a group common physical downlink control channel (GC-PDCCH) communication.

In a twenty-seventh aspect, alone or in combination with one or more of the first through twenty-sixth aspects, the configuration indicates a bit field, of the GC-PDCCH communication, to be monitored by the UE to receive the indication.

In a twenty-eighth aspect, alone or in combination with one or more of the first through twenty-seventh aspects, process 1200 includes receiving configured grant uplink control information, that includes an identifier of the UE, in association with the configured grant uplink communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some Aspects of the present disclosure:

Aspect 1: A method of wireless communication performed by a user equipment (UE), comprising: receiving a configuration of one or more resource pools for configured grant uplink communications; receiving an indication that modifies a number of resources, in the one or more resource pools, that are available for configured grant uplink communications; and transmitting a configured grant uplink communication in the one or more resource pools based at least in part on the indication.

Aspect 2: The method of Aspect 1, wherein the configuration indicates a first set of uplink transmission occasions, in a resource pool of the one or more resource pools, that are activated by default, and a second set of uplink transmission occasions, in the resource pool, that are deactivated by default.

Aspect 3: The method of Aspect 2, wherein the first set of uplink transmission occasions are always activated and cannot be dynamically deactivated, and wherein the second set of uplink transmission occasions can be dynamically activated or deactivated.

Aspect 4: The method of any of Aspects 2-3, wherein a time between reception of the indication and a starting symbol of the second set of uplink transmission occasions satisfies a threshold.

Aspect 5: The method of any of Aspects 2-4, wherein transmitting the configured grant uplink communication comprises: attempting transmission of the configured grant uplink communication in the first set of uplink transmission occasions; determining that transmission of the configured grant uplink communication in the first set of uplink transmission occasions has failed; and transmitting the configured grant uplink communication in the second set of uplink transmission occasions based at least in part on determining that transmission of the configured grant uplink communication in the first set of uplink transmission occasions has failed.

Aspect 6: The method of any of Aspects 2-5, wherein the second set of uplink transmission occasions is available for transmission of the configured grant uplink communication only if transmission of the configured grant uplink communication in the first set of uplink transmission occasions fails.

Aspect 7: The method of any of Aspects 2-6, wherein the indication activates or deactivates one or more uplink transmission occasions included in the second set of uplink transmission occasions.

Aspect 8: The method of any of Aspects 2-7, wherein the indication is a single bit that indicates activation or deactivation of one or more uplink transmission occasions included in the second set of uplink transmission occasions.

Aspect 9: The method of Aspect 8, wherein the indication occurs at a fixed time or within a fixed range of times before an uplink transmission occasion that is activated or deactivated by the indication.

Aspect 10: The method of any of Aspects 8-9, wherein the indication occurs within a first time range corresponding to a first uplink transmission occasion, of the second set of uplink transmission occasions, and within a second time range corresponding to a second uplink transmission occasion of the second set of uplink transmission occasions, and wherein the indication activates one of: an earlier-occurring occasion of the first uplink transmission occasion and the second uplink transmission occasion, or both the first uplink transmission occasion and the second uplink transmission occasion.

Aspect 11: The method of any of Aspects 8-10, further comprising identifying an uplink transmission occasion, included in the second set of uplink transmission occasions, that is activated by the indication based at least in part on a time at which the indication is received.

Aspect 12: The method of any of Aspects 2-11, wherein the first set of uplink transmission occasions is associated with a first admission probability parameter that is different from a second admission probability parameter associated with the second set of uplink transmission occasions.

Aspect 13: The method of Aspect 12, wherein the configuration or another message indicates the first admission probability parameter and the second admission probability parameter.

Aspect 14: The method of Aspect 12, wherein the second admission probability parameter is derived from the first admission probability parameter.

Aspect 15: The method of any of Aspects 2-14, further comprising determining a hybrid automatic repeat request (HARQ) process identifier for the configured grant uplink communication based at least in part on an assumption that the second set of uplink transmission occasions is activated, wherein a HARQ process identifier associated with a transmission occasion in the second set of uplink transmission occasions is different from a HARQ process identifier associated with a transmission occasion, in the first set of uplink transmission occasions, that occurs immediately prior to the transmission occasion in the second set of uplink transmission occasions.

Aspect 16: The method of any of Aspects 2-14, further comprising determining a hybrid automatic repeat request (HARQ) process identifier for the configured grant uplink communication based at least in part on an assumption that the second set of uplink transmission occasions is deactivated, wherein a HARQ process identifier associated with a transmission occasion in the second set of uplink transmission occasions is a same HARQ process identifier associated with a transmission occasion, in the first set of uplink transmission occasions, that occurs immediately prior to the transmission occasion in the second set of uplink transmission occasions.

Aspect 17: The method of Aspect 1, wherein the configuration indicates multiple sizes of a resource pool of the one or more resource pools, and wherein the indication indicates an activated size, of the multiple sizes, for the resource pool.

Aspect 18: The method of Aspect 17, wherein the configuration indicates a default size of the multiple sizes, and wherein the indication modifies the default size.

Aspect 19: The method of any of Aspects 17-18, wherein a time between reception of the indication and a starting symbol of an uplink transmission occasion, included in the resource pool, to which the activated size applies satisfies a threshold.

Aspect 20: The method of any of Aspects 17-19, wherein the indication is an index value that corresponds to a size of the multiple sizes.

Aspect 21: The method of any of Aspects 17-20, wherein the activated size applies to subsequent uplink transmission occasions until at least one of: reception of a new indication that indicates a different size than the activated size, expiration of a timer that triggers a return to a default size, or a combination thereof.

Aspect 22: The method of any of Aspects 17-21, wherein the multiple sizes of the resource pool include a first size and a second size, wherein the first size is a subset of the second size.

Aspect 23: The method of Aspect 22, further comprising: determining that access has failed for a first set of resources associated with the second size, wherein the first set of resources is the same as an entire set of resources associated with the first size; and attempting access using a second set of resources associated with the second size based at least in part on determining that access has failed for the first set of resources associated with the second size, wherein the second set of resources is not included in the entire set of resources associated with the first size.

Aspect 24: The method of Aspect 1, wherein the configuration indicates multiple resource pools that have different sizes, and wherein the indication indicates a resource pool of the multiple resource pools.

Aspect 25: The method of Aspect 24, wherein the configuration indicates a default resource pool of the multiple resource pools.

Aspect 26: The method of any of Aspects 24-25, wherein a time between reception of the indication and a starting symbol of an uplink transmission occasion, included in a resource pool activated by the indication, satisfies a threshold.

Aspect 27: The method of any of Aspects 24-26, wherein the indication is an index value that corresponds to a resource pool of the multiple resource pools.

Aspect 28: The method of any of Aspects 24-27, wherein the indication activates a resource pool, of the multiple resource pools, until at least one of: reception of a new indication that indicates a different resource pool than the resource pool activated by the indication, expiration of a timer that triggers a return to a default resource pool, or a combination thereof.

Aspect 29: The method of any of Aspects 24-28, wherein the multiple resource pools includes a first resource pool and a second resource pool, wherein the first resource pool is a subset of the second resource pool.

Aspect 30: The method of Aspect 29, further comprising: determining that access has failed for a first set of resources included in the second resource pool, wherein the first set of resources is the same as an entire set of resources included in the first resource pool; and attempting access using a second set of resources included in the second resource pool based at least in part on determining that access has failed for the first set of resources included in the second resource pool, wherein the second set of resources is not included in the entire set of resources included in the first resource pool.

Aspect 31: The method of any of Aspects 1-30, wherein the indication is included in a group common physical downlink control channel (GC-PDCCH) communication.

Aspect 32: The method of Aspect 31, wherein the configuration indicates a bit field, of the GC-PDCCH communication, to be monitored by the UE to receive the indication.

Aspect 33: The method of any of Aspects 1-32, further comprising transmitting configured grant uplink control information, that includes an identifier of the UE, in association with the configured grant uplink communication.

Aspect 34: A method of wireless communication performed by a base station, comprising: transmitting, to a user equipment (UE), a configuration of one or more resource pools for configured grant uplink communications; transmitting, to the UE, an indication that modifies a number of resources, in the one or more resource pools, that are available for configured grant uplink communications; and receiving, from the UE, a configured grant uplink communication in the one or more resource pools based at least in part on the indication.

Aspect 35: The method of Aspect 34, wherein the indication that modifies the number of resources is transmitted based at least in part on a determination of whether uplink traffic satisfies a threshold.

Aspect 36: The method of any of Aspects 34-35, wherein the configuration indicates a first set of uplink transmission occasions, in a resource pool of the one or more resource pools, that are activated by default, and a second set of uplink transmission occasions, in the resource pool, that are deactivated by default.

Aspect 37: The method of Aspect 36, wherein the first set of uplink transmission occasions are always activated and cannot be dynamically deactivated, and wherein the second set of uplink transmission occasions can be dynamically activated or deactivated.

Aspect 38: The method of any of Aspects 36-37, wherein a time between transmission of the indication and a starting symbol of the second set of uplink transmission occasions satisfies a threshold.

Aspect 39: The method of any of Aspects 36-38, wherein the second set of uplink transmission occasions is available for transmission of the configured grant uplink communication only if transmission of the configured grant uplink communication in the first set of uplink transmission occasions fails.

Aspect 40: The method of any of Aspects 36-39, wherein the indication activates or deactivates one or more uplink transmission occasions included in the second set of uplink transmission occasions.

Aspect 41: The method of any of Aspects 36-40, wherein the indication is a single bit that indicates activation or deactivation of one or more uplink transmission occasions included in the second set of uplink transmission occasions.

Aspect 42: The method of Aspect 41, wherein the indication occurs at a fixed time or within a fixed range of times before an uplink transmission occasion that is activated or deactivated by the indication.

Aspect 43: The method of any of Aspects 41-42, wherein the indication occurs within a first time range corresponding to a first uplink transmission occasion, of the second set of uplink transmission occasions, and within a second time range corresponding to a second uplink transmission occasion of the second set of uplink transmission occasions, and wherein the indication activates one of: an earlier-occurring occasion of the first uplink transmission occasion and the second uplink transmission occasion, or both the first uplink transmission occasion and the second uplink transmission occasion.

Aspect 44: The method of any of Aspects 41-43, wherein the indication identifies an uplink transmission occasion, included in the second set of uplink transmission occasions, that is activated by the indication based at least in part on a time at which the indication is transmitted.

Aspect 45: The method of any of Aspects 36-44, wherein the first set of uplink transmission occasions is associated with a first admission probability parameter that is different from a second admission probability parameter associated with the second set of uplink transmission occasions.

Aspect 46: The method of Aspect 45, wherein the configuration or another message indicates the first admission probability parameter and the second admission probability parameter.

Aspect 47: The method of Aspect 45, wherein the second admission probability parameter is derived from the first admission probability parameter.

Aspect 48: The method of Aspect 34, wherein the configuration indicates multiple sizes of a resource pool of the one or more resource pools, and wherein the indication indicates an activated size, of the multiple sizes, for the resource pool.

Aspect 49: The method of Aspect 48, wherein the configuration indicates a default size of the multiple sizes, and wherein the indication modifies the default size.

Aspect 50: The method of any of Aspects 48-49, wherein a time between transmission of the indication and a starting symbol of an uplink transmission occasion, included in the resource pool, to which the activated size applies satisfies a threshold.

Aspect 51: The method of any of Aspects 48-50, wherein the indication is an index value that corresponds to a size of the multiple sizes.

Aspect 52: The method of any of Aspects 48-51, wherein the activated size applies to subsequent uplink transmission occasions until at least one of: transmission of a new indication that indicates a different size than the activated size, expiration of a timer that triggers a return to a default size, or a combination thereof.

Aspect 53: The method of any of Aspects 48-52, wherein the multiple sizes of the resource pool include a first size and a second size, wherein the first size is a subset of the second size.

Aspect 54: The method of Aspect 34, wherein the configuration indicates multiple resource pools that have different sizes, and wherein the indication indicates a resource pool of the multiple resource pools.

Aspect 55: The method of Aspect 54, wherein the configuration indicates a default resource pool of the multiple resource pools.

Aspect 56: The method of any of Aspects 54-55, wherein a time between transmission of the indication and a starting symbol of an uplink transmission occasion, included in a resource pool activated by the indication, satisfies a threshold.

Aspect 57: The method of any of Aspects 54-56, wherein the indication is an index value that corresponds to a resource pool of the multiple resource pools.

Aspect 58: The method of any of Aspects 54-57, wherein the indication activates a resource pool, of the multiple resource pools, until at least one of: transmission of a new indication that indicates a different resource pool than the resource pool activated by the indication, expiration of a timer that triggers a return to a default resource pool, or a combination thereof.

Aspect 59: The method of any of Aspects 54-58, wherein the multiple resource pools includes a first resource pool and a second resource pool, wherein the first resource pool is a subset of the second resource pool.

Aspect 60: The method of any of Aspects 34-59, wherein the indication is included in a group common physical downlink control channel (GC-PDCCH) communication.

Aspect 61: The method of Aspect 60, wherein the configuration indicates a bit field, of the GC-PDCCH communication, to be monitored by the UE to receive the indication.

Aspect 62: The method of any of Aspects 34-61, further comprising receiving configured grant uplink control information, that includes an identifier of the UE, in association with the configured grant uplink communication.

Aspect 63: An apparatus for wireless communication at a device, comprising a processor; memory coupled with the processor; and instructions stored in the memory and executable by the processor to cause the apparatus to perform the method of one or more of Aspects 1-33.

Aspect 64: An apparatus for wireless communication at a device, comprising a processor; memory coupled with the processor; and instructions stored in the memory and executable by the processor to cause the apparatus to perform the method of one or more of Aspects 34-62.

Aspect 65: A device for wireless communication, comprising a memory and one or more processors coupled to the memory, the memory and the one or more processors configured to perform the method of one or more Aspects of Aspects 1-33.

Aspect 66: A device for wireless communication, comprising a memory and one or more processors coupled to the memory, the memory and the one or more processors configured to perform the method of one or more Aspects of Aspects 34-62.

Aspect 67: An apparatus for wireless communication, comprising at least one means for performing the method of one or more of Aspects 1-33.

Aspect 68: An apparatus for wireless communication, comprising at least one means for performing the method of one or more of Aspects 34-62.

Aspect 69: A non-transitory computer-readable medium storing code for wireless communication, the code comprising instructions executable by a processor to perform the method of one or more of Aspects 1-33.

Aspect 70: A non-transitory computer-readable medium storing code for wireless communication, the code comprising instructions executable by a processor to perform the method of one or more of Aspects 34-62.

Aspect 71: A non-transitory computer-readable medium storing a set of instructions for wireless communication, the set of instructions comprising one or more instructions that, when executed by one or more processors of a device, cause the device to perform the method of one or more of Aspects 1-33.

Aspect 72: A non-transitory computer-readable medium storing a set of instructions for wireless communication, the set of instructions comprising one or more instructions that, when executed by one or more processors of a device, cause the device to perform the method of one or more of Aspects 34-62.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a configuration of one or more resource pools for configured grant uplink communications;
   receiving an indication that modifies a number of resources, in the one or more resource pools, that are available for configured grant uplink communications, wherein the indication occurs within a first time range corresponding to a first uplink transmission occasion and within a second time range corresponding to a second uplink transmission occasion, and wherein the indication activates one of:
   an earlier-occurring occasion of the first uplink transmission occasion and the second uplink transmission occasion, or
   both the first uplink transmission occasion and the second uplink transmission occasion; and
   transmitting a configured grant uplink communication in the one or more resource pools based at least in part on the indication.

2. The method of claim 1, wherein the configuration indicates a first set of uplink transmission occasions, in a resource pool of the one or more resource pools, that are activated by default, and a second set of uplink transmission occasions, in the resource pool, that are deactivated by default, wherein the first set of uplink transmission occasions are always activated and are not configured to be dynamically deactivated, and wherein the second set of uplink transmission occasions are configured to be dynamically activated or deactivated.

3. The method of claim 2, wherein the second set of uplink transmission occasions is available for transmission of the configured grant uplink communication only when transmission of the configured grant uplink communication in the first set of uplink transmission occasions fails, and transmitting the configured grant uplink communication comprises:
attempting transmission of the configured grant uplink communication in the first set of uplink transmission occasions;
determining that transmission of the configured grant uplink communication in the first set of uplink transmission occasions has failed; and
transmitting the configured grant uplink communication in the second set of uplink transmission occasions based at least in part on determining that transmission of the configured grant uplink communication in the first set of uplink transmission occasions has failed.

4. The method of claim 2, wherein the indication is a single bit that indicates activation or deactivation of one or more uplink transmission occasions included in the second set of uplink transmission occasions, and wherein the indication occurs at a fixed time or within a fixed range of times before a third uplink transmission occasion that is activated or deactivated by the indication.

5. The method of claim 4, wherein the second set of uplink transmission occasions includes the first uplink transmission and the second uplink transmission.

6. The method of claim 2, wherein the first set of uplink transmission occasions is associated with a first admission probability parameter that is different from a second admission probability parameter associated with the second set of uplink transmission occasions, wherein the first admission probability parameter is indicated in the configuration or another message, and wherein the second admission probability parameter is derived from the first admission probability parameter or indicated in the configuration or another message.

7. The method of claim 2, further comprising determining a hybrid automatic repeat request (HARQ) process identifier for the configured grant uplink communication based at least in part on an assumption that the second set of uplink transmission occasions is deactivated, wherein a HARQ process identifier associated with a transmission occasion in the second set of uplink transmission occasions is a same HARQ process identifier associated with a transmission occasion, in the first set of uplink transmission occasions, that occurs immediately prior to the transmission occasion in the second set of uplink transmission occasions.

8. The method of claim 1, wherein the configuration indicates multiple sizes of a resource pool of the one or more resource pools, and wherein the indication indicates an activated size, of the multiple sizes, for the resource pool.

9. The method of claim 8, wherein the configuration indicates a default size of the multiple sizes, and wherein the indication modifies the default size.

10. The method of claim 8, wherein the indication is an index value that corresponds to a size of the multiple sizes, wherein a time between reception of the indication and a starting symbol of a third uplink transmission occasion, included in the resource pool, to which the activated size applies satisfies a threshold, and wherein the activated size applies to subsequent uplink transmission occasions until at least one of:
reception of a new indication that indicates a different size than the activated size,
expiration of a timer that triggers a return to a default size, or
a combination thereof.

11. The method of claim 8, wherein the multiple sizes of the resource pool include a first size and a second size, wherein the first size is a subset of the second size, and wherein the method further comprises:
determining that access has failed for a first set of resources associated with the second size, wherein the first set of resources is the same as an entire set of resources associated with the first size; and
attempting access using a second set of resources associated with the second size based at least in part on determining that access has failed for the first set of resources associated with the second size, wherein the second set of resources is not included in the entire set of resources associated with the first size.

12. The method of claim 1, wherein the configuration indicates multiple resource pools that have different sizes, and wherein the indication indicates a resource pool of the multiple resource pools.

13. The method of claim 12, wherein the configuration indicates a default resource pool of the multiple resource pools.

14. The method of claim 12, wherein the indication is an index value that corresponds to a resource pool of the multiple resource pools, wherein a time between reception of the indication and a starting symbol of a third uplink transmission occasion, included in a resource pool activated by the indication, satisfies a threshold, and wherein the indication activates a resource pool, of the multiple resource pools, until at least one of:
reception of a new indication that indicates a different resource pool than the resource pool activated by the indication,
expiration of a timer that triggers a return to a default resource pool, or
a combination thereof.

15. The method of claim 12, wherein the multiple resource pools includes a first resource pool and a second resource pool, wherein the first resource pool is a subset of the second resource pool, and wherein the method further comprises:
determining that access has failed for a first set of resources included in the second resource pool, wherein the first set of resources is the same as an entire set of resources included in the first resource pool; and
attempting access using a second set of resources included in the second resource pool based at least in part on determining that access has failed for the first set of resources included in the second resource pool, wherein the second set of resources is not included in the entire set of resources included in the first resource pool.

16. The method of claim 1, wherein the indication is included in a group common physical downlink control channel (GC-PDCCH) communication, and wherein the configuration indicates a bit field, of the GC-PDCCH communication, to be monitored by the UE to receive the indication.

17. The method of claim 1, further comprising transmitting configured grant uplink control information, that includes an identifier of the UE, in association with the configured grant uplink communication.

18. A method of wireless communication performed by a network entity, comprising:
transmitting, to a user equipment (UE), a configuration of one or more resource pools for configured grant uplink communications;

transmitting, to the UE, an indication that modifies a number of resources, in the one or more resource pools, that are available for configured grant uplink communications, wherein the indication occurs within a first time range corresponding to a first uplink transmission occasion and within a second time range corresponding to a second uplink transmission occasion, and wherein the indication activates one of:
an earlier-occurring occasion of the first uplink transmission occasion and the second uplink transmission occasion, or
both the first uplink transmission occasion and the second uplink transmission occasion; and
receiving, from the UE, a configured grant uplink communication in the one or more resource pools based at least in part on the indication.

19. The method of claim 18, wherein the indication that modifies the number of resources is transmitted based at least in part on a determination of whether uplink traffic satisfies a threshold.

20. The method of claim 18, wherein the configuration indicates a first set of uplink transmission occasions, in a resource pool of the one or more resource pools, that are activated by default, and a second set of uplink transmission occasions, in the resource pool, that are deactivated by default.

21. The method of claim 18, wherein the configuration indicates multiple sizes of a resource pool of the one or more resource pools or the configuration indicates multiple resource pools that have different sizes, and wherein the indication indicates an activated size, of the multiple sizes, for the resource pool of the one or more resource pools or the indication indicates an activated resource pool of the multiple resource pools that have different sizes.

22. A user equipment (UE) for wireless communication, comprising:
a memory; and
one or more processors coupled to the memory, the one or more processors configured to:
receive a configuration of one or more resource pools for configured grant uplink communications;
receive an indication that modifies a number of resources, in the one or more resource pools, that are available for configured grant uplink communications, wherein the indication occurs within a first time range corresponding to a first uplink transmission occasion and within a second time range corresponding to a second uplink transmission occasion, and wherein the indication activates one of:
an earlier-occurring occasion of the first uplink transmission occasion and the second uplink transmission occasion, or
both the first uplink transmission occasion and the second uplink transmission occasion; and
transmit a configured grant uplink communication in the one or more resource pools based at least in part on the indication.

23. The UE of claim 22, wherein the configuration indicates a first set of uplink transmission occasions, in a resource pool of the one or more resource pools, that are activated by default, and a second set of uplink transmission occasions, in the resource pool, that are deactivated by default.

24. The UE of claim 22, wherein the configuration indicates multiple sizes of a resource pool of the one or more resource pools, and wherein the indication indicates an activated size, of the multiple sizes, for the resource pool.

25. The UE of claim 22, wherein the configuration indicates multiple resource pools that have different sizes, and wherein the indication indicates a resource pool of the multiple resource pools.

26. The UE of claim 22, wherein the indication is included in a group common physical downlink control channel (GC-PDCCH) communication.

27. A network entity for wireless communication, comprising:
a memory; and
one or more processors coupled to the memory, the memory and the one or more processors configured to:
transmit, to a user equipment (UE), a configuration of one or more resource pools for configured grant uplink communications;
transmit, to the UE, an indication that modifies a number of resources, in the one or more resource pools, that are available for configured grant uplink communications, wherein the indication occurs within a first time range corresponding to a first uplink transmission occasion and within a second time range corresponding to a second uplink transmission occasion, and wherein the indication activates one of:
an earlier-occurring occasion of the first uplink transmission occasion and the second uplink transmission occasion, or
both the first uplink transmission occasion and the second uplink transmission occasion; and
receive, from the UE, a configured grant uplink communication in the one or more resource pools based at least in part on the indication.

28. The network entity of claim 27, wherein the indication that modifies the number of resources is transmitted based at least in part on a determination of whether uplink traffic satisfies a threshold.

29. The network entity of claim 27, wherein the configuration indicates a first set of uplink transmission occasions, in a resource pool of the one or more resource pools, that are activated by default, and a second set of uplink transmission occasions, in the resource pool, that are deactivated by default.

30. The network entity of claim 27, wherein the configuration indicates multiple sizes of a resource pool of the one or more resource pools or the configuration indicates multiple resource pools that have different sizes, and wherein the indication indicates an activated size, of the multiple sizes, for the resource pool of the one or more resource pools or the indication indicates an activated resource pool of the multiple resource pools that have different sizes.

* * * * *